US012250910B2

(12) United States Patent
Hosomi et al.

(10) Patent No.: US 12,250,910 B2
(45) Date of Patent: Mar. 18, 2025

(54) MANAGEMENT DEVICE FOR CULTIVATION OF FRUIT VEGETABLE PLANTS AND FRUIT TREES, LEARNING DEVICE, MANAGEMENT METHOD FOR CULTIVATION OF FRUIT VEGETABLE PLANTS AND FRUIT TREES, LEARNING MODEL GENERATION METHOD, MANAGEMENT PROGRAM FOR CULTIVATION OF FRUIT VEGETABLE PLANTS AND FRUIT TREES, AND LEARNING MODEL GENERATION PROGRAM

(71) Applicant: OMRON Corporation, Kyoto (JP)

(72) Inventors: Shinichi Hosomi, Kyoto (JP); Sho Sasaki, Kyoto (JP); Atsushi Hashimoto, Tokyo (JP); Hiroyuki Miyaura, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/298,729

(22) PCT Filed: Sep. 29, 2020

(86) PCT No.: PCT/JP2020/036846
§ 371 (c)(1),
(2) Date: Jun. 1, 2021

(87) PCT Pub. No.: WO2021/065891
PCT Pub. Date: Apr. 8, 2021

(65) Prior Publication Data
US 2022/0225583 A1    Jul. 21, 2022

(30) Foreign Application Priority Data
Oct. 4, 2019   (JP) ................................. 2019-184104

(51) Int. Cl.
*A01G 22/05* (2018.01)
*G06Q 10/0631* (2023.01)
*G06Q 50/02* (2024.01)

(52) U.S. Cl.
CPC ....... *A01G 22/05* (2018.02); *G06Q 10/06313* (2013.01); *G06Q 50/02* (2013.01)

(58) Field of Classification Search
None
See application file for complete search history.

(56) References Cited

U.S. PATENT DOCUMENTS

2017/0131254 A1* 5/2017 Shriver .............. G01N 33/0098
2017/0332544 A1* 11/2017 Conrad .................. G06N 20/00
(Continued)

FOREIGN PATENT DOCUMENTS

CN    101162384 A    4/2008
EP    3046066 A1     7/2016
(Continued)

OTHER PUBLICATIONS

Extended European Search Report issued in European Appln. No. 20871156.4 mailed Dec. 21, 2022.
(Continued)

*Primary Examiner* — Sara Grace Brown
(74) *Attorney, Agent, or Firm* — ROSSI, KIMMS & McDOWELL LLP

(57) ABSTRACT

A cultivation and management device for fruit vegetable plants and fruit trees includes environment state information on an environment state of a fruit vegetable plant or a fruit tree to be cultivated, planned cultivation evaluation index information on a preplanned cultivation evaluation index of the fruit vegetable plant or the fruit tree, a calculation unit configured to determine and output a work including a shape change work for the fruit vegetable plant or the fruit tree
(Continued)

with respect to inputs of the environment state information and the planned cultivation evaluation index information with a learning model, and an output unit configured to output the work including the shape change work for the fruit vegetable plant or the fruit tree.

6 Claims, 19 Drawing Sheets

(56) References Cited

U.S. PATENT DOCUMENTS

| | | | | |
|---|---|---|---|---|
| 2018/0271015 | A1* | 9/2018 | Redden | G06N 3/08 |
| 2019/0050948 | A1* | 2/2019 | Perry | G06F 30/27 |
| 2019/0166765 | A1* | 6/2019 | Maor | G05D 1/106 |
| 2019/0261566 | A1* | 8/2019 | Robertson | G06T 7/50 |
| 2019/0340749 | A1* | 11/2019 | Schwartzer | G01N 21/31 |
| 2019/0347836 | A1* | 11/2019 | Sangireddy | A01C 21/005 |
| 2020/0120886 | A1* | 4/2020 | Geltner | G06V 20/188 |
| 2020/0273172 | A1* | 8/2020 | Weldemariam | G06N 5/022 |
| 2021/0029890 | A1 | 2/2021 | Kurihara | |
| 2022/0053122 | A1* | 2/2022 | Scheiner | A01G 7/00 |
| 2022/0146409 | A1* | 5/2022 | Hamilton | G01J 3/502 |
| 2022/0189329 | A1* | 6/2022 | Rosat | G05B 19/4155 |
| 2022/0250246 | A1* | 8/2022 | Schmitt | A01G 31/02 |

FOREIGN PATENT DOCUMENTS

| | | | | |
|---|---|---|---|---|
| JP | H11299351 | A | | 11/1999 |
| JP | H11313594 | A | | 11/1999 |
| JP | 2008003984 | A | * | 1/2008 |
| JP | 5756374 | B2 | | 7/2015 |
| JP | 2016101117 | A | | 6/2016 |
| WO | WO-2019073472 | A1 | * | 4/2019 ........... A01B 79/005 |
| WO | 2019107179 | A1 | | 6/2019 |

OTHER PUBLICATIONS

International Search Report issued in Intl. Appln. No. PCT/JP2020/036846 mailed Nov. 24, 2020. English translation provided.

Written Opinion issued in Intl. Appln. No. PCT/JP2020/036846 mailed Nov. 24, 2020. English translation provided.

Office Action issued in Chinese Appln. No. 202080006629.0, mailed Sep. 6, 2023. English translation provided.

Lu et al. "Excellent Varieties and High Quality and High Yield Cultivation Techniques of Wine Grapes." Gansu Science and Technology Publishing House. 2008: 109-116.

Office Action issued in Chinese Appln. No. 202080006629.0 mailed Aug. 2, 2024. English machine translation provided.

* cited by examiner

MANAGEMENT DEVICE FOR CULTIVATION OF FRUIT VEGETABLE PLANTS AND FRUIT TREES, LEARNING DEVICE, MANAGEMENT METHOD FOR CULTIVATION OF FRUIT VEGETABLE PLANTS AND FRUIT TREES, LEARNING MODEL GENERATION METHOD, MANAGEMENT PROGRAM FOR CULTIVATION OF FRUIT VEGETABLE PLANTS AND FRUIT TREES, AND LEARNING MODEL GENERATION PROGRAM

TECHNICAL FIELD

The invention relates to a cultivation and management device for fruit vegetable plants and fruit trees, a learning device, a cultivation and management method for fruit vegetable plants and fruit trees, a learning model generation method, a cultivation and management program for fruit vegetable plants and fruit trees, and a learning model generation program.

BACKGROUND ART

Conventionally, as a method for managing plant cultivation, Patent Document 1 proposes the next technique. First, field conditions are calculated based on future weather conditions, a work plan registered by a user in a work plan table, and a formula for calculating field conditions. Then, a growth state of prediction target cropping on a prediction target date is calculated using a prediction model based on the field conditions in a period from a prediction start date to the prediction target date. Here, it is determined whether or not a predicted growth range, which is a possible range of an index for evaluating the predicted growth state obtained as described above, is included in a manageable range, which is a criterion for determining whether or not the growth of crop is successful. This determination indicates whether or not the prediction target cropping will achieve the growth state desired by the user.

However, the conventional technique as described above shows a result whether or not the growth state desired by the user will be achieved when cultivation is carried out based on the work plan table registered by the user. However, the technique does not give instructions for how to change the work plan when the growth state desired by the user will not be achieved.

In addition, in the cultivation of fruit vegetable plants including fruits of herbaceous plants such as tomatoes, strawberries, and melons, it is not enough to simply grow plants large. Their cultivation is difficult due to complicated parameters required for producing nutritious and tasteful fruits, and the like in addition to the number of fruits harvested. In order to grow such fruit vegetable plants as desired by the user, more complicated cultivation is required. However, the prior art does not target such complicated cultivation. Therefore, even when a work is performed according to the work plan, the growth state desired by the user may have not been achieved.

PRIOR ART DOCUMENTS

Patent Documents

Patent Document 1: Japanese Patent No. 5756374

SUMMARY OF THE INVENTION

Problems to be Solved by the Invention

The invention has been made in view of the above problems, and therefore an object of the invention is to provide a technique capable of giving an appropriate work instruction.

Means for Solving the Problem

A cultivation and management device for fruit vegetable plants and fruit trees of the invention includes:
environment state information on an environment state of a fruit vegetable plant or a fruit tree to be cultivated;
planned cultivation evaluation index information on a preplanned cultivation evaluation index of the fruit vegetable plant or the fruit tree;
a calculation unit configured to determine and output a work including a shape change work for the fruit vegetable plant or the fruit tree with respect to inputs of the environment state information and the planned cultivation evaluation index information, the calculation unit using a learning model trained on a cultivation evaluation index of the fruit vegetable plant or the fruit tree cultivated, an environment state of the fruit vegetable plant or the fruit tree when cultivating the fruit vegetable plant or the fruit tree, and a work history of a work for the fruit vegetable plant or the fruit tree, the work including the shape change work for changing a shape of the fruit vegetable plant or the fruit tree when cultivating the fruit vegetable plant or the fruit tree; and
an output unit configured to output the work including the shape change work for the fruit vegetable plant or the fruit tree.

In the invention, the learning model is trained on the cultivation evaluation index of the cultivated fruit vegetable plant or fruit tree, the environment state of the fruit vegetable plant or the fruit tree when cultivating the fruit vegetable plant or the fruit tree, and the work history of the work for the fruit vegetable plant or the fruit tree, the work including the shape change work for changing the shape of the fruit vegetable plant or the fruit tree when cultivating the fruit vegetable plant or the fruit tree, so as to determine and output the work including the shape change work for the fruit vegetable plant or the fruit tree with respect to inputs of the environment state information and the planned cultivation evaluation index information. Therefore, according to the cultivation and management device for fruit vegetable plants or fruit trees of the invention, the learning model determines and outputs the work including the shape change work, taking into account the history of work including the shape change work for the fruit vegetable plant or the fruit tree. Accordingly, appropriate work instructions can be given.

Here, the environment state information is information on the state of environment in which the cultivation target plant is placed. The environment state information may include, but is not limited to, temperature, humidity, and illuminance. The work history information is information including a history of work including a work whose amount of work cannot be expressed as a continuous value, such as a shape change work. The shape change work is a work of modifying a shape of the cultivated fruit vegetable plant or fruit tree, or modifying both shape and element or tissue of the fruit vegetable plant or the fruit tree, including removal such as bud removal, foliage removal, flower picking, topping, fruit thinning, stem mutilation, and weeding, and plant training. The cultivation evaluation index is an index for evaluating a cultivation result of the fruit vegetable plant or the fruit tree, and includes a yield, which is information on yield obtained as a result of cultivating the fruit vegetable plant or the fruit tree. As the cultivation evaluation index, a sugar content, a sugar acid ratio, a single fruit weight, a leaf area, a stem thickness, and the like can be used, but are not limited thereto.

Further, a cultivation and management device for fruit vegetable plants and fruit trees of the invention includes:
environment state information on an environment state of a fruit vegetable plant or a fruit tree to be cultivated;
work history information on a history of a work for the fruit vegetable plant or the fruit tree, the work including a shape change work for changing a shape of the fruit vegetable plant or the fruit tree;
a calculation unit configured to output a predicted cultivation evaluation index of the fruit vegetable plant or the fruit tree with respect to inputs of the environment state information and the work history information, the calculation unit using a learning model trained on a cultivation evaluation index of the fruit vegetable plant or the fruit tree cultivated, an environment state of the fruit vegetable plant or the fruit tree when cultivating the fruit vegetable plant or the fruit tree, and a work history of a work including the shape change work for the fruit vegetable plant or the fruit tree when cultivating the fruit vegetable plant or the fruit tree; and
an output unit configured to output the predicted cultivation evaluation index of the fruit vegetable plant or the fruit tree.

In the invention, the learning model is trained on the cultivation evaluation index of the cultivated fruit vegetable plant or fruit tree, the environment state of the fruit vegetable plant or the fruit tree when cultivating the fruit vegetable plant or the fruit tree, and the work history of the work including the shape change work for the fruit vegetable plant or the fruit tree when cultivating the fruit vegetable plant or the fruit tree, so as to output the predicted cultivation evaluation index of the fruit vegetable plant or the fruit tree with respect to inputs of the environment state information and the work history information. Therefore, according to the cultivation and management device for fruit vegetable plants and fruit trees of the invention, the learning model outputs the predicted cultivation evaluation index, taking into account the history of work including the shape change work for the fruit vegetable plant or the fruit tree. Accordingly, a cultivation evaluation index can be predicted with high accuracy.

Further, a learning device of the invention includes:
a training environment state information acquisition unit configured to acquire training environment state information on an environment state of a fruit vegetable plant or a fruit tree to be cultivated;
a training work history information acquisition unit configured to acquire training work history information on a history of a work for the fruit vegetable plant or the fruit tree, the work including a shape change work for changing a shape of the fruit vegetable plant or the fruit tree when cultivating the fruit vegetable plant or the fruit tree;
a training cultivation evaluation index acquisition unit configured to acquire training cultivation evaluation index information on a cultivation evaluation index of the fruit vegetable plant or the fruit tree; and
a learning process unit configured to generate a learning model configured to determine and output a work including the shape change work for the fruit vegetable plant or the fruit tree with respect to inputs of environment state information and preplanned cultivation evaluation index information of the fruit vegetable plant or the fruit tree when cultivating the fruit vegetable plant or the fruit tree, the learning model being trained on training data including at least the training environment state information, the training work history information, and the training cultivation evaluation index information.

In the invention, the learning model is generated by being trained on the training data including the training environment state information, training work history information, and the training cultivation evaluation index information. Therefore, the learning device of the invention can generate the learning model that takes into account human intervention in the cultivation of the fruit vegetable plant or the fruit tree, including the shape change work.

Here, the training environment state information is environment information used as the training data for training the learning model. The training work history information is work history information used as the training data for training the learning model. The training cultivation evaluation index information is cultivation evaluation index information used as the training data for training the learning model.

Further, a cultivation and management method for fruit vegetable plants and fruit trees of the invention executes on a computer the steps of:
acquiring environment state information on an environment state of a fruit vegetable plant or a fruit tree to be cultivated;
acquiring planned cultivation evaluation index information on a preplanned cultivation evaluation index of the fruit vegetable plant or the fruit tree; and
determining a work including a shape change work for the fruit vegetable plant or the fruit tree based on the environment state information and the planned cultivation evaluation index information acquired, using a learning model trained on the cultivation evaluation index of the fruit vegetable plant or the fruit tree cultivated, the environment state when cultivating the fruit vegetable plant or the fruit tree, and a work history of a work for the fruit vegetable plant or the fruit tree, the work including the shape change work for changing the shape of the fruit vegetable plant or the fruit tree when cultivating the fruit vegetable plant or the fruit tree.

In the invention, the work including the shape change work for the fruit vegetable plant or the fruit tree is determined with respect to inputs of the environment state information and the planned cultivation evaluation index information, using the learning model trained on the cultivation evaluation index of the fruit vegetable plant or the fruit tree cultivated, the environment state of the fruit vegetable plant or the fruit tree when cultivating the fruit vegetable plant or the fruit tree, and the history of work for the fruit vegetable plant or the fruit tree, the work including the shape change work for changing the shape of the fruit vegetable plant or the fruit tree when cultivating the fruit vegetable plant or the fruit tree. Therefore, according to the cultivation and management method for fruit vegetable plants and fruit trees, the learning model determines and outputs the work including the shape change work, taking into account the history of work including the shape change work for the fruit vegetable plant or the fruit tree. Accordingly, appropriate work instructions can be given.

Here, the order of acquiring the environment state information and the planned cultivation evaluation index information is not limited to the above.

Further, a cultivation and management method for fruit vegetable plants and fruit trees of the invention executes on a computer the steps of:
acquiring environment state information on an environment state of a fruit vegetable plant or a fruit tree to be cultivated;
acquiring work history information on a history of work for the fruit vegetable plant or the fruit tree, the work including a shape change work for changing a shape of the fruit vegetable plant or the fruit tree; and
outputting a predicted cultivation evaluation index of the fruit vegetable plant or the fruit tree based on the environment state information and the work history information acquired, using a learning model trained on a cultivation evaluation index of the fruit vegetable plant or the fruit tree cultivated, an environment state of the fruit vegetable plant or the fruit tree when cultivating the fruit vegetable plant or the fruit tree, and a work history of a work including the shape change work for the fruit vegetable plant or the fruit tree when cultivating the fruit vegetable plant or the fruit tree.

In the invention, the learning model is trained on the cultivation evaluation index of the cultivated fruit vegetable plant or fruit tree, the environment state of the fruit vegetable plant or the fruit tree when cultivating the fruit vegetable plant or the fruit tree, and the work history of the work including the shape change work for the fruit vegetable plant or the fruit tree when cultivating the fruit vegetable plant or the fruit tree, so as to output the predicted cultivation evaluation index of the fruit vegetable plant or the fruit tree with respect to inputs of the environment state information and the work history information. Therefore, according to the cultivation and management method for fruit vegetable plants and fruit trees of the invention, the learning model outputs the predicted cultivation evaluation index, taking into account the history of work including the shape change work for cultivation of the fruit vegetable plant or the fruit tree. Accordingly, a cultivation evaluation index can be predicted with high accuracy.

Here, the order of acquiring the environment state information and the work history information is not limited to the above.

Further, a learning model generation method of the invention executes on a computer the steps of:
acquiring training cultivation evaluation index information on a cultivation evaluation index when a fruit vegetable plant or a fruit tree is cultivated;
acquiring training environment state information on an environment state of the fruit vegetable plant or the fruit tree cultivated;
acquiring training work history information on a history of a work for the fruit vegetable plant or the fruit tree, the work including a shape change work for changing a shape of the fruit vegetable plant or the fruit tree cultivated; and
generating a learning model configured to determine a work including the shape change work for the fruit vegetable plant or the fruit tree based on environment state information on an environment state of the fruit vegetable plant or the fruit tree and planned cultivation evaluation index, which is information on a preplanned cultivation evaluation index of the fruit vegetable plant or the fruit tree, the learning model being trained on training data including at least the training cultivation evaluation index information, the training environment state information, and the training work history information.

In the invention, the learning model is generated by being trained on the training data including at least the training work history information in addition to the training cultivation evaluation index and the training environment state information, so as to determine the work including the shape change work for the fruit vegetable plant or the fruit tree. Therefore, the learning model generation method of the invention can generate the learning model that takes into account human intervention in the cultivation of the fruit vegetable plant or the fruit tree, including the shape change work.

Here, the order of acquiring the training cultivation evaluation index, the training environment state information, and the training work history information is not limited to the above.

In addition, the step of generating the learning model may include the step of generating the learning model by reinforcement learning in which the environment state information is set as an environment state, the work including the shape change work for the fruit vegetable plant or the fruit tree is set as an action on the environment, and the cultivation evaluation index is set as a reward.

Further, a cultivation and management program for fruit vegetable plants and fruit trees of the invention executes on a computer the steps of:
acquiring environment state information on an environment state of a fruit vegetable plant or a fruit tree to be cultivated;
acquiring planned cultivation evaluation index information on a preplanned cultivation evaluation index of the fruit vegetable plant or the fruit tree; and
determining a work including a shape change work for the fruit vegetable plant or the fruit tree based on the environment state information and the planned cultivation evaluation index information acquired, using a learning model trained on the cultivation evaluation index of the fruit vegetable plant or the fruit tree cultivated, the environment state when cultivating the fruit vegetable plant or the fruit tree, and a work history of a work for the fruit vegetable plant or the fruit tree, the work including the shape change work for changing a shape of the fruit vegetable plant or the fruit tree when cultivating the fruit vegetable plant or the fruit tree.

In the invention, the work including the shape change work for the fruit vegetable plant or the fruit tree is determined with respect to inputs of the environment state information and the planned cultivation evaluation index information, using the learning model trained on the cultivation evaluation index of the fruit vegetable plant or the fruit tree cultivated, the environment state of the fruit vegetable plant or the fruit tree when cultivating the fruit vegetable plant or the fruit tree, and the history of work for the fruit vegetable plant or the fruit tree, the work including the shape change work for changing the shape of the fruit vegetable plant or the fruit tree when cultivating the fruit vegetable plant or the fruit tree. Therefore, according to the cultivation and management program for fruit vegetable plants and fruit trees of the invention, the learning model determines and outputs the work including the shape change work, taking into account the history of work including the shape change work for the fruit vegetable plant or the fruit tree. Accordingly, appropriate work instructions can be given.

Here, the order of acquiring the environment state information and the planned cultivation evaluation index information is not limited to the above.

Further, a cultivation and management program for fruit vegetable plants and fruit trees of the invention executes on a computer the steps of:
acquiring environment state information on an environment state of a fruit vegetable plant or a fruit tree to be cultivated;
acquiring work history information on a history of a work for the fruit vegetable plant or the fruit tree, the work including a shape change work for changing a shape of the fruit vegetable plant or the fruit tree; and
outputting a predicted cultivation evaluation index of the fruit vegetable plant or the fruit tree based on the environment state information and the work history information acquired, using a learning model trained on a cultivation evaluation index of the fruit vegetable plant or the fruit tree cultivated, an environment state of the fruit vegetable plant or the fruit tree when cultivating the fruit vegetable plant or the fruit tree, and a work history of a work including the shape change work for the fruit vegetable plant or the fruit tree when cultivating the fruit vegetable plant or the fruit tree.

In the invention, the learning model is trained on the cultivation evaluation index of the cultivated fruit vegetable plant or fruit tree, the environment state of the fruit vegetable plant or the fruit tree when cultivating the fruit vegetable plant or the fruit tree, and the work history of the work including the shape change work for the fruit vegetable plant or the fruit tree when cultivating the fruit vegetable plant or the fruit tree, so as to output the predicted cultivation evaluation index of the fruit vegetable plant or the fruit tree with respect to inputs of the environment state information and the work history information. Therefore, according to the cultivation and management program for fruit vegetable plants and fruit trees of the invention, the learning model outputs the predicted cultivation evaluation index, taking into account the history of work including the shape change work for the fruit vegetable plant or the fruit tree. Accordingly, a cultivation evaluation index can be predicted with high accuracy.

Here, the order of acquiring the environment state information and the work history information is not limited to the above.

Further, a learning model generation program of the invention executes on a computer the steps of:
acquiring training cultivation evaluation index information on a cultivation evaluation index when a fruit vegetable plant or a fruit tree is cultivated;
acquiring training environment state information on an environment state of the fruit vegetable plant or the fruit tree cultivated;
acquiring training work history information on a history of a work for the fruit vegetable plant or the fruit tree, the work including a shape change work for changing a shape of the fruit vegetable plant or the fruit tree cultivated; and
generating a learning model configured to determine a work including the shape change work for the fruit vegetable plant or the fruit tree based on environment state information on an environment state of the fruit vegetable plant or the fruit tree and planned cultivation evaluation index, which is information on a preplanned cultivation evaluation index of the fruit vegetable plant or the fruit tree, the learning model being trained on training data including at least the training cultivation evaluation index information, the training environment state information, and the training work history information.

In the invention, the learning model that determines the work including the shape change work for the fruit vegetable plant or the fruit tree is generated by being trained on the training data including at least the training work history information in addition to the training cultivation evaluation index and the training environment state information. Therefore, the learning model generation program of the invention can generate the learning model that takes into account human intervention in the cultivation of the fruit vegetable plant or the fruit tree, including the shape change work.

Here, the order of acquiring the training cultivation evaluation index, the training environment state information, and the training work history information is not limited to the above.

Effect of the Invention

According to the invention, it is possible to provide a technique capable of giving an appropriate work instruction.

MODE FOR CARRYING OUT THE INVENTION

Application Examples

Hereinafter, application examples of the invention will be described with reference to the drawings.

Figure 5:
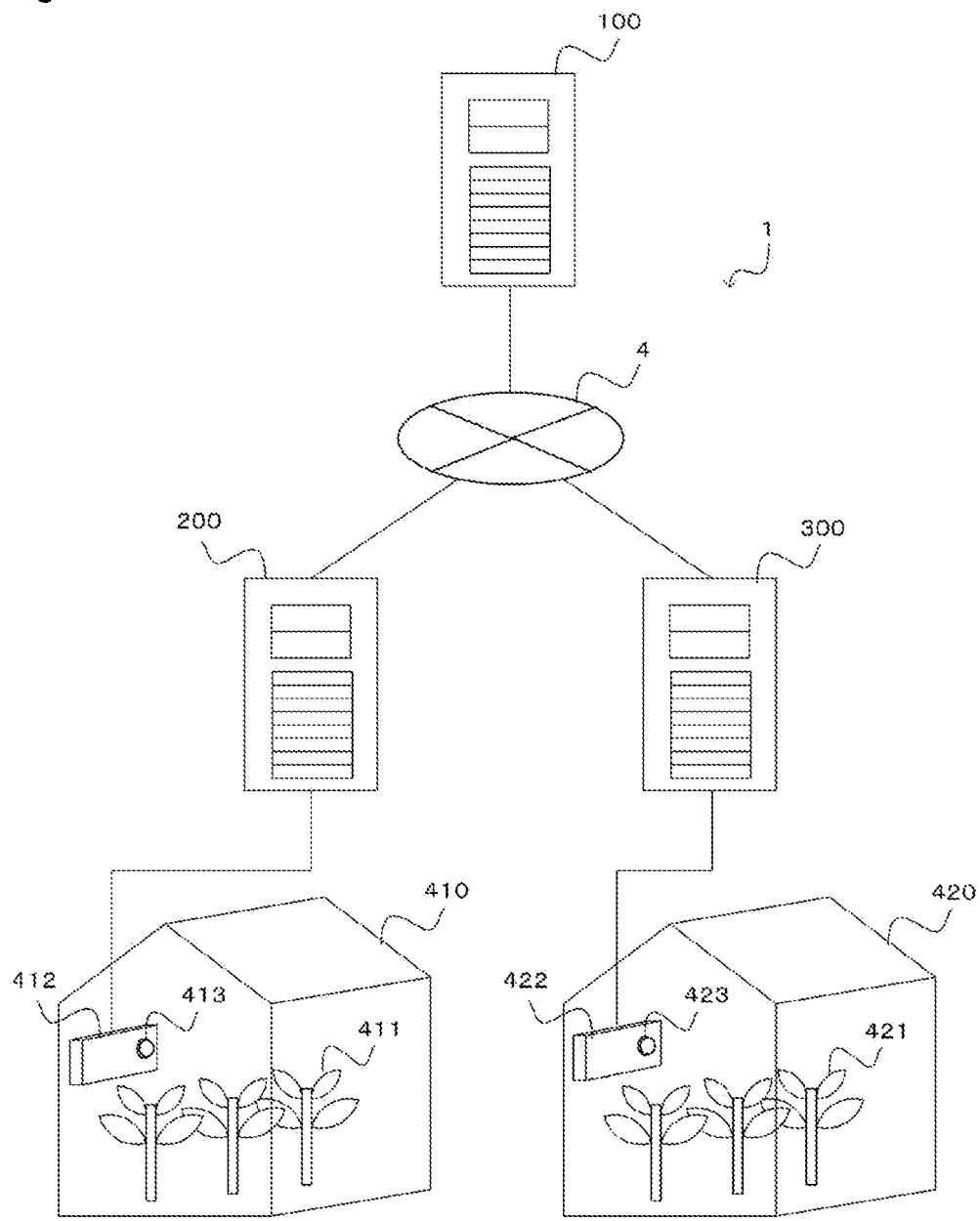
FIG. 5 is a schematic configuration diagram of a cultivation and management system according to the first embodiment of the invention.
Figure 7A:
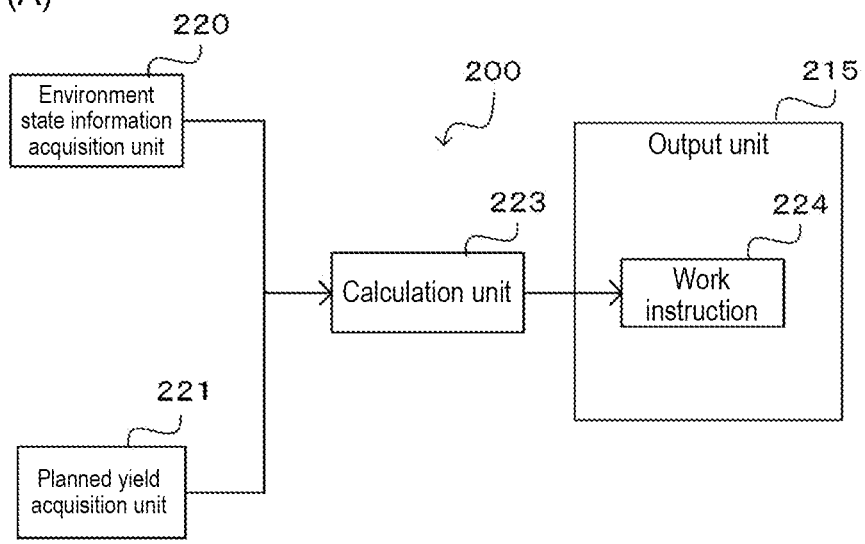
FIGS. 7(A) and 7(B) are functional block diagrams of the cultivation and management device according to the first embodiment of the invention.
Figure 7B:
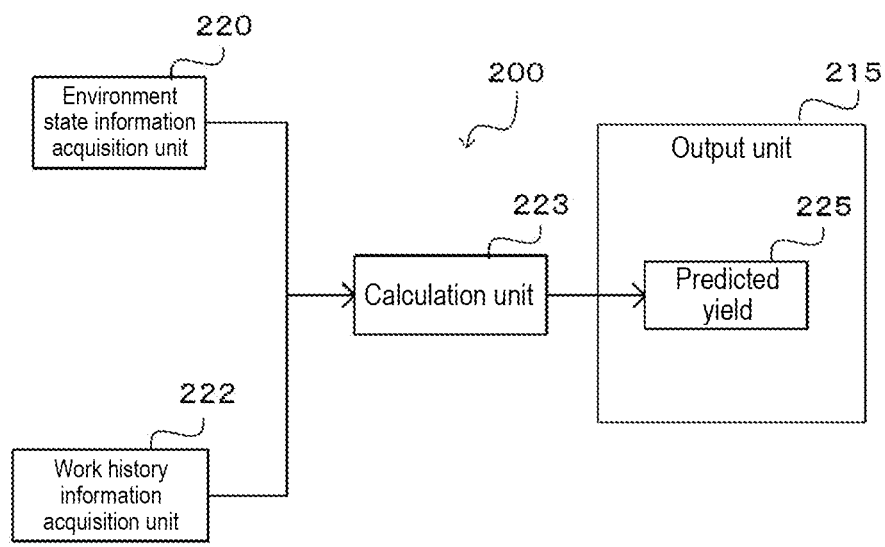

FIG. 5 shows a cultivation and management system 1 including cultivation and management devices 200 and 300 to which the invention is applied. FIGS. 7(A) and 7(B) show functional block diagrams of the cultivation and management device 200. Here, the case where the cultivation and management device 200 outputs work instructions for fruit vegetable plants or fruit trees will be described. However, as described later, the cultivation and management device 200 can also be configured to output a yield.

A learner 25 that outputs work instructions is generated in a learning device 100. In the learning device 100 (see FIG. 2), a learning process unit 24 trains and generates the learner 25, using training environment state information, training work history information, and training yield information as training data, so that the learner 25 outputs work instructions including a shape change work when environment state information and planned yield are input. Since the learner 25 is trained using the training environment state information and the training yield information as input data and a work history including the shape change work as supervised data, the learner 25 can output an appropriate work instruction.

In the cultivation and management device 200, work instructions including the shape change work are output by inputting to the learner 25 generated as described above the environment state information and the planned yield information related to cultivation target fruit vegetable plants or fruit trees. As described above, since the learner 25 generated is trained using the training environment state information and the training yield information as the input data, and the work history including the shape change work as the supervised data, the cultivation and management device 200 can output an appropriate work instruction.

Further, by configuring the cultivation and management system with the learning device 100 and the cultivation and management devices 200 and 300, training data can be collected from the cultivation and management device 200 or 300 to further train the learner to improve its performance. Then, by providing an updated learner to the cultivation and management devices 200 and 300, more accurate cultivation becomes possible.

First Embodiment

Hereinafter, a learning device and a cultivation and management device according to the first embodiment of the invention will be described in more detail with reference to the drawings. Hereinafter, a cultivation and management device for fruit vegetable plants and fruit trees, a cultivation and management method for fruit vegetable plants and fruit trees, and a cultivation and management program for fruit vegetable plants and fruit trees are simply referred to as a cultivation and management device, a cultivation and management method, and a cultivation and management program, respectively.

First is described a process of generating, through training, a model used for cultivation management.

<Device Configuration>

Figure 1:
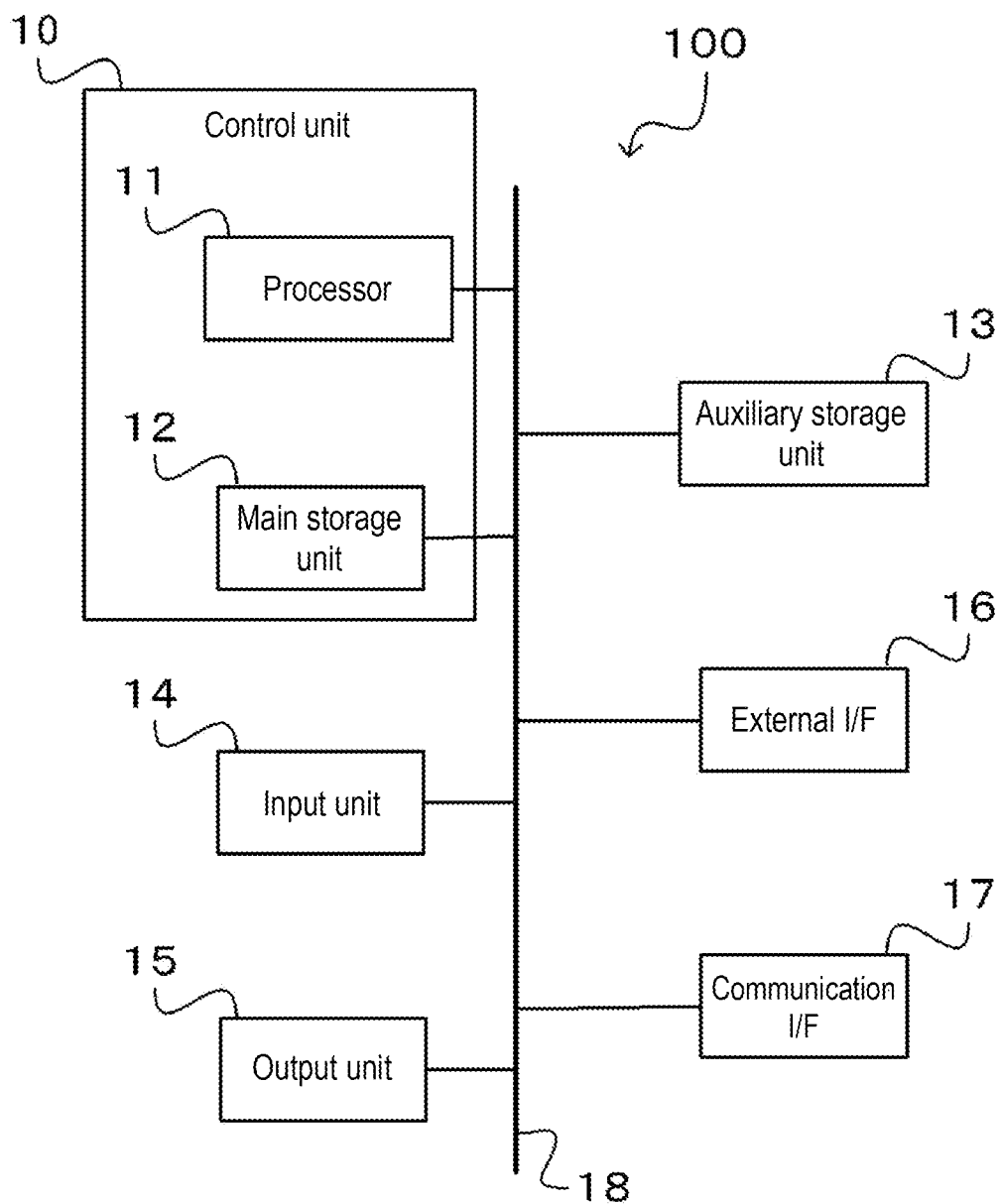
FIG. 1 is a hardware configuration diagram of a learning device according to a first embodiment of the invention.

FIG. 1 is a hardware configuration diagram of a learning device 100 according to the embodiment.

The learning device 100 is a computer device including a processor 11, a main storage unit 12, an auxiliary storage unit 13, an input unit 14, an output unit 15, an external interface 16, a communication interface 17, and a bus 18.

The processor 11 is a CPU, a DSP, or the like.

The main storage unit 12 is configured with a read only memory (ROM), a random access memory (RAM), and the like.

The auxiliary storage unit 13 includes an erasable programmable ROM (EPROM), a hard disk drive (HDD), a removable medium, and the like. The removable medium is, for example, a flash memory such as a USB memory or an SD card, or a disc recording medium such as a CD-ROM, a DVD disc, or a Blu-ray disc. The auxiliary storage unit 13 stores an operating system (OS), various programs, various tables, and the like. The processor 11 executes the stored programs loaded into a work area of the main storage unit 12 to control each component or the like through program execution and realize each functional unit that fulfills a predetermined purpose as described later. However, some or all of the functional units may be realized by a hardware circuit such as an application specific integrated circuit (ASIC) or field programmable gate array (FPGA). Note that the learning device 100 does not necessarily have to be realized by a single physical configuration, and may be configured with a plurality of computers linked to each other. Hereinafter, the main storage unit 12 and the processor 11 that executes a predetermined program loaded into the work area of the main storage unit 12 are also collectively referred to as a control unit 10.

The input unit 14 includes a keyboard, a mouse, a microphone, and the like, and accepts input operations from the user.

The output unit 15 includes a display, a speaker, and the like, and provides information to the user.

The external interface (indicated as I/F in the drawings) 16 is an interface for connection to various external devices.

The communication interface 17 is an interface for connecting the learning device 100 to a network. The communication interface 17 can adopt an appropriate configuration depending on a connection system with the network.

The bus 18 is a signal transmission line connecting each part of the learning device 100.

Figure 2:
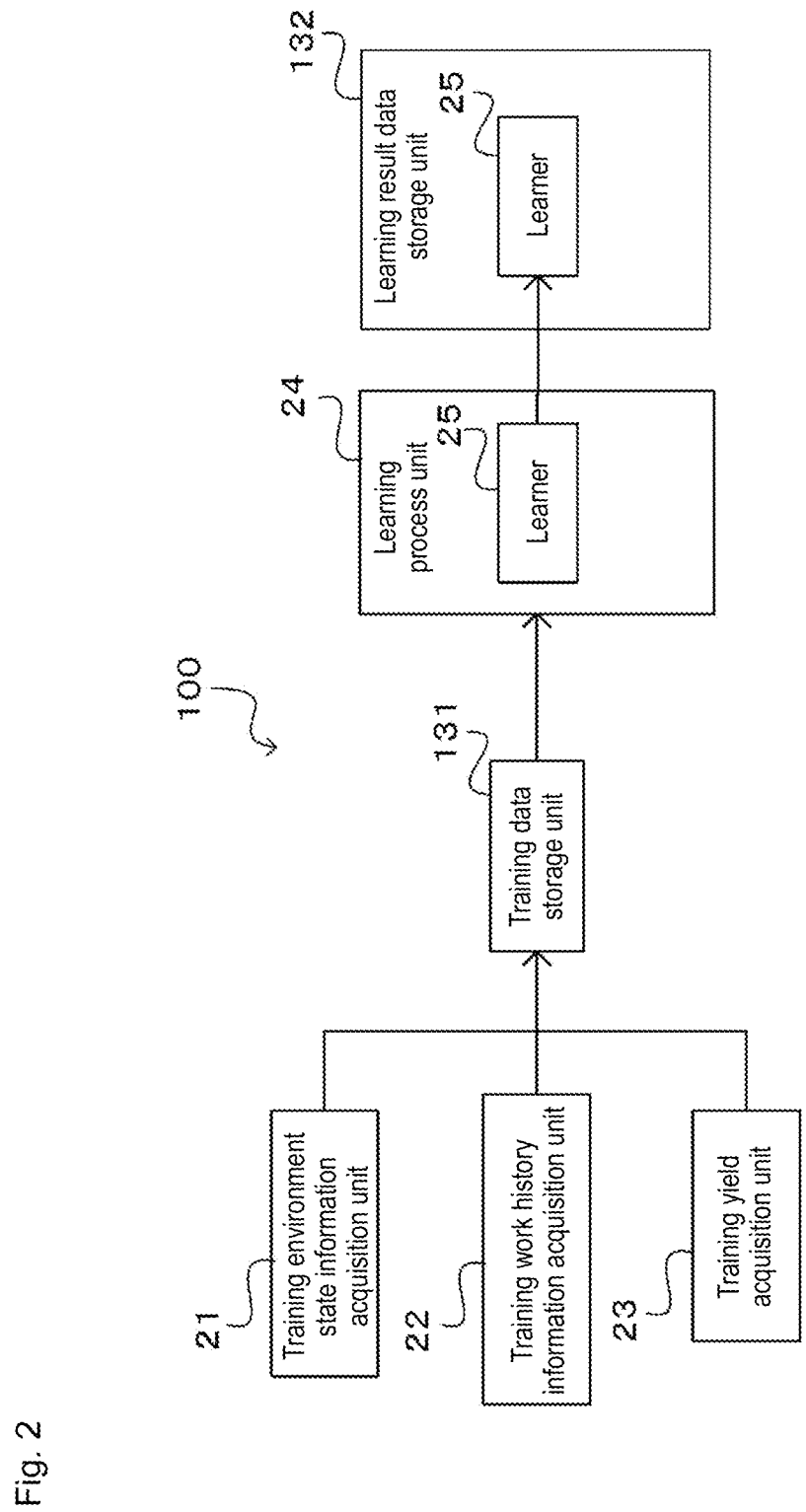
FIG. 2 is a functional block diagram of the learning device according to the first embodiment of the invention.

FIG. 2 is a functional block diagram of the learning device 100.

The learning device 100 includes a training environment state information acquisition unit 21, a training work history information acquisition unit 22, a training yield acquisition unit 23, a learning process unit 24, and a learner 25.

The training environment state information acquisition unit 21 is a means for acquiring environment state information that is information on the environment state in which a cultivation target fruit vegetable plant or fruit tree is placed. The environment state information may include, but is not limited to, a temperature, humidity, and illuminance. The environment state information used as training data is referred to as the training environment state information. In the following description, a fruit vegetable plant or a fruit tree will be referred to simply as a "plant".

The training work history information acquisition unit 22 is a means for acquiring work history information that quantifies a history of work including a work whose amount of work cannot be expressed as a continuous value, such as a shape change work for the cultivation target plant. The work history information used as the training data is referred to as the training work history information.

The training yield acquisition unit 23 is a means for acquiring yield information that is information on a yield achieved as a result of cultivating the cultivation target plant. The yield information used as the training data is called the training yield information. The training yield acquisition unit 23 corresponds to a training cultivation evaluation index acquisition unit of the invention. Here, the yield is explained as an example of the cultivation evaluation index. However, the cultivation evaluation index is an index for evaluating a cultivation result of a fruit vegetable plant or a fruit tree, and may include, but is not limited to, a sugar content, a sugar acid ratio, a single fruit weight, a leaf area, and a stem thickness.

Here, the control unit 10 may acquire the training environment state information, the training work history information, and the training yield information input by the user via the input unit 14. In this case, the input unit 14 and the control unit 10 configure the training environment state information acquisition unit 21, the training work history information acquisition unit 22, and the training yield acquisition unit 23. The user may also directly input the training work history information via the input unit 14. Further, the control unit 10 may convert the information input by the user via the input unit 14 to acquire the training work history information. Here, the control unit 10 functions as a quantification means. In this way, the user does not need to input the work history in a quantified format, reducing a burden of the user's input work. For example, to input the work history, the user selects a work type from a pull-down menu displayed on a display as the output unit 15, and selects a work amount from a work amount pull-down menu displayed according to the selected work type. For example, in the learning device 100, a work type flag corresponding to the selected work type (for example, when a work is flower picking, a flower picking flag) is set to on, and a numerical value (for example, 3) quantified based on the unit (here, quantity) specified according to the work type is acquired as the training work history information. Works in plant cultivation are an act that directly affects a plant or an act that indirectly affects a plant through the environment such as soil. Some works have an irreversible effect of changing a shape of plant, while others can be repeated without changing the shape of plant. Such works include outlining, pruning, soil preparation, cultivation management, and spraying. Pruning includes bud removal, foliage removal, flower picking, topping, fruit thinning, stem mutilation, and weeding. Soil preparation includes soil disinfection, ridging, plowing, and base fertilizer. Cultivation management includes sowing, planting, support erection, and plant training. Among these works, a work that will change the shape of plant is referred to as a shape change work. The shape change work includes thinning, picking, and removal as described above that modifies both a plant element or tissue and plant shape, and plant training that modifies only the plant shape. Spraying includes fertilization, irrigation, pesticide spraying, and natural enemy pesticide spraying. Bud removal, flower picking, topping, and fruit thinning can be quantified by quantity. Foliage removal can be quantified by the number of leaves, stem mutilation by the number of stems, and weeding by the number of weeds. Soil disinfection, plowing, and base fertilizer can be quantified by the number of times. Ridging can be quantified by spacing and depth. Sowing and planting can be quantified by quantity. Support erection and plant training can be quantified by the number of supports and the like. Fertilization, irrigation, pesticide spraying, and natural enemy pesticide spraying can be quantified by a spraying amount and the like.

Further, regarding environment state information such as a temperature, a humidity, and an illuminance that can be detected by detectors such as a temperature sensor, a humidity sensor, and an illuminance sensor; the control unit 10 may control these sensors through the external interface 16 to acquire the training environment state information. In this case, the external interface 16 and the control unit 10 connected to each of the sensors configure the training environment state information acquisition unit 21. The training work history information and the training yield information may also be acquired from an external device without user input.

In addition, regarding outdoor temperature and humidity in the environment state information that are acquired from an external server via the network, the control unit 10 may acquire the information from the external server via the network such as the Internet through the communication interface 17. In this case, the communication interface 17 and the control unit 10 configure the training environment state information acquisition unit 21.

The training data storage unit 131, which is a predetermined area of the auxiliary storage unit 13, stores the training environment state information, the training work history information, and the training yield information acquired through the training environment state information acquisition unit 21, the training work history information acquisition unit 22, and the training yield acquisition unit 23.

Here, the training environment state information, the training work history information, and the training yield information are associated in chronological order with respect to the cultivation target plant. In other words, these pieces of information are associated with each other in chronological order, with respect to a certain plant, as the environment state information on an environment state at a specific date and time, the work history information on a history of work performed at a specific date and time, and the yield information at a specific date and time. In addition, these pieces of information may be acquired for each stem of the cultivation target plant, or may be collectively acquired for a group of stems cultivated in a predetermined plot or a predetermined greenhouse. Corresponding to each case, the training environment state information, the training work history information, and the training yield information are associated with each other by information that identifies each stem or the group of stems.

The learning process unit 24 performs machine learning of the learner so as to output a work when the training environment state information and the training yield information stored in the training data storage unit 131 are input. The learning process unit 24 performs machine learning by reading and executing by the control unit 10 a learning model generation program stored in a predetermined area of the auxiliary storage unit 13. Here, the learner is a model that predicts a work required for achieving a target yield by using the training environment state information and the training yield information as training data, and the training work history information as supervised data. For example, the program may calculate the model by a neural network, but is not limited to this.

By repeating machine learning of the learner in the learning process unit 24 using a large amount of training data, a trained learner 25 is obtained. The trained learner 25 obtained in this way is stored in the learning result data storage unit 132, which is a predetermined area of the auxiliary storage unit 13. Here, the learner 25 corresponds to a learning model of the invention.

<Learning Model Generation Method>

Figure 3:
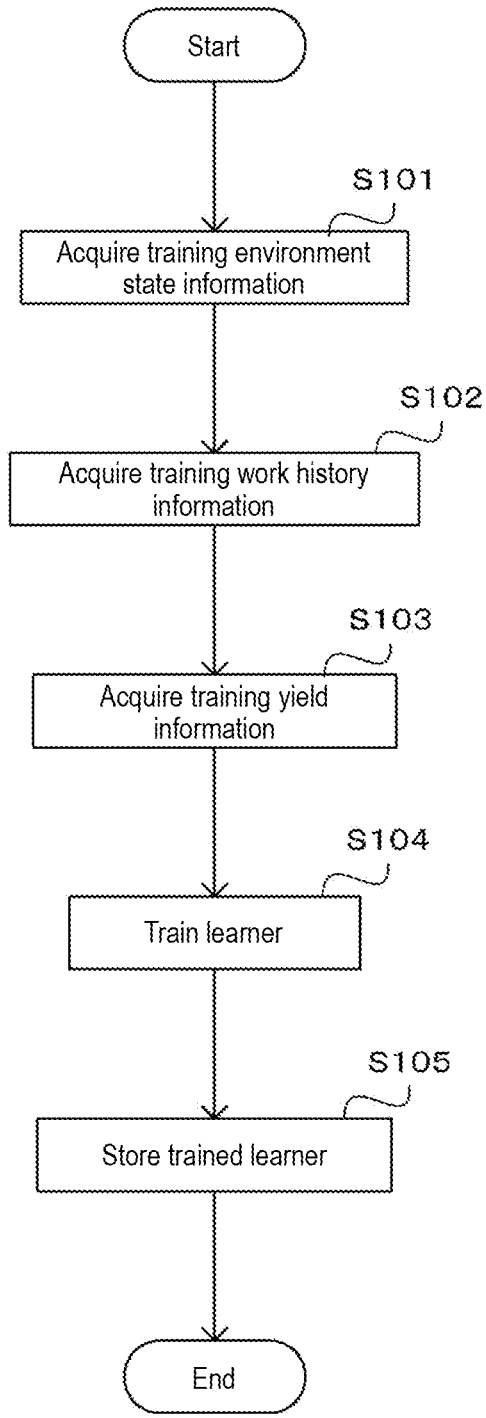
FIG. 3 is a flowchart showing process steps of a learning model generation method according to the first embodiment of the invention.

FIG. 3 is a flowchart showing process steps of the learning model generation method. This learning model generation method is executed as the learning model generation program in the learning device 100.

First, the control unit 10 acquires the training environment state information (step S101).

Next, the control unit 10 acquires the training work history information (step S102).

Next, the control unit 10 acquires the training yield information (step S103).

Then, the learning process unit 24 trains the above-mentioned learner, using the training environment state information and the training yield information acquired as the input data and the training work history information as the supervised data (step S104).

Figure 4A:
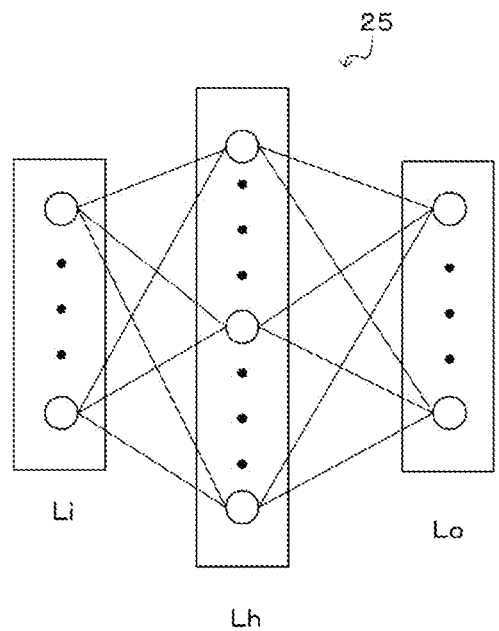
FIGS. 4(A) and 4(B) are diagrams showing examples of a configuration of a learner according to the first embodiment of the invention.

Here, the case where the learner 25 is configured with the neural network will be described as an example. As shown in FIG. 4(A), an input layer Li, an intermediate layer Lh, and an output layer Lo are provided in this order from the input. The number of intermediate layers Lh is not limited to one, and two or more intermediate layers Lh may be provided.

The input layer Li has multiple nodes. Each piece of information such as humidity, temperature, and illuminance for a specific plant at a specific date and time or time zone is input to each node of the input layer as the training environment state information. In addition, a yield of the specific plant at the specific date and time or time zone is input to each node of the input layer.

The number of nodes in the intermediate layer Lh can be set as appropriate. The number of nodes in the output layer Lo is set according to the data to be output.

Nodes in adjacent layers are appropriately connected, and weights are set for each connection. The node of the output layer includes a work including the shape change work, and calculation of the work including the shape change work is repeated while adjusting the weight to reduce a loss function indicating a difference from the training work history information, which is the supervised data.

By repeating the process from step S101 to step S104 for a large amount of training data, the trained learner 25 is output from the learning process unit 24, and the control unit 10 acquires and stores the trained learner 25 in the learning result data storage unit 132 (step S105).

In this way, the learner capable of giving appropriate work instructions is generated, taking into account human intervention, including the shape change work, in cultivation of the target plant.

Figure 4B:
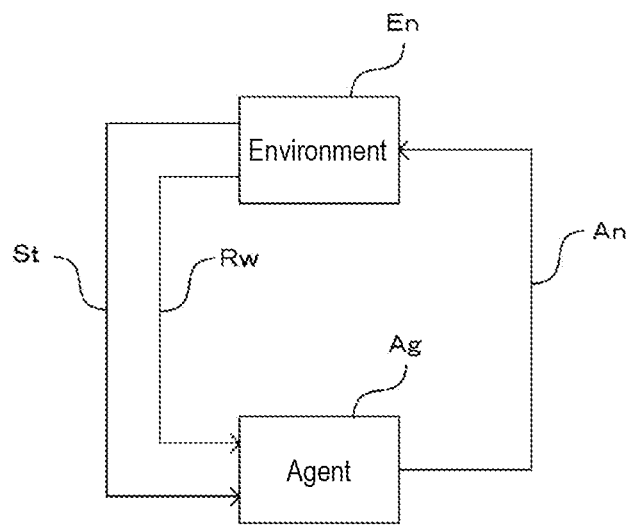

In the above-mentioned learning model generation method, the learner 25 configured with the neural network has been described, but the learning model generation method is not limited to the neural network. As shown in FIG. 4(B), the learner 25 may be trained by so-called reinforcement learning. FIG. 4(B) is a schematic diagram showing a general mechanism of reinforcement learning.

In the embodiment, an environment En corresponds to the environment including greenhouses 410 and 420 in which plants 411 and 421 are cultivated, and the learning device 100 or the cultivation and management devices 200 and 300 correspond to an agent Ag. In this case, the environment state information corresponds to a state St of the environment En, the work including the shape change work corresponds to an action An for the environment En by the agent Ag, and the yield information corresponds to a reward Rw.

The learner 25 is trained with respect to the action An that maximizes the reward Rw under the state St in the learner 25. In other words, the learner 25 learns the work including the shape change work that maximizes the yield under a certain environment state. In this reinforcement learning, the neural network as shown in FIG. 4(A) may be used.

In this way, by performing reinforcement learning using the training environment state information, the training work history information, and the training yield information, it is possible to generate the learner 25 that outputs the work including the shape change work by inputting the environment state information and the yield information.

Next, a process of cultivation management based on inference using the model generated by training will be described below.

<Cultivation and Management System>

FIG. 5 is a schematic diagram showing a schematic configuration of the cultivation and management system 1 including the learning device 100 and cultivation and management devices 200 and 300 according to the embodiment.

The learning device 100, the cultivation and management device 200, and the cultivation and management device 300 are connected via the network 4. The cultivation and management device 200 is connected to a controller 412 of the greenhouse 410 in which the plant 411 is cultivated. The cultivation and management device 300 is also connected to a controller 422 of the greenhouse 420 in which the plant 421 is similarly cultivated. Hereinafter, the cultivation and management device 200 will be described, but the same applies to the cultivation and management device 300. Further, the cultivation and management device 200 is not limited to a case where it is connected to the controller 412 of one greenhouse 410, and may be connected to controllers of a plurality of greenhouses. The learner 25 generated in the learning device 100 is transmitted to the cultivation and management devices 200 and 300 via the network 4. Further, the cultivation and management devices 200 and 300 transmit the training environment state information, the training work history information, and the training yield information to the learning device 100 via the network 4. By configuring the cultivation and management system with the learning device 100 and the cultivation and management devices 200 and 300, training data can be collected from the cultivation and management devices 200 and 300 to further train the learner to improve its performance. Then, by providing an updated learner to the cultivation and management devices 200 and 300, more accurate cultivation becomes possible.

Here, a temperature/humidity sensor 413 is provided to measure a temperature and humidity of the greenhouse 410 with respect to the environment state of the cultivation target plant 411. The temperature/humidity sensor 413 is connected to the controller 412, and the temperature and humidity measured by the temperature/humidity sensor 413 are transmitted to the cultivation and management device 200 via the controller 412 and acquired by the cultivation and management device 200 as environment state information. The greenhouse 420 is also provided with a temperature/humidity sensor 423.

<Cultivation and Management Device>

Figure 6:
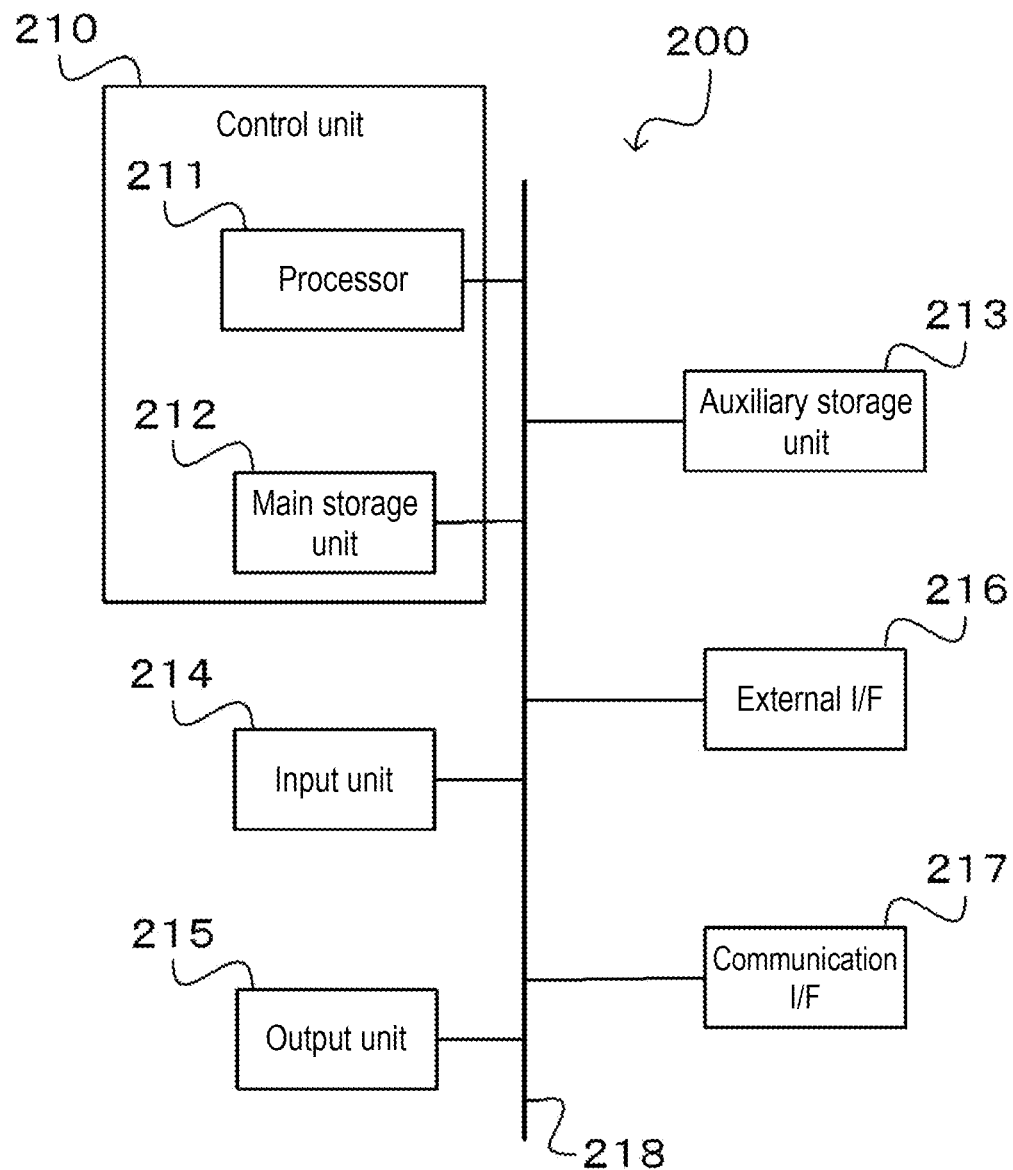
FIG. 6 is a hardware configuration diagram of a cultivation and management device according to the first embodiment of the invention.

FIG. 6 is a hardware configuration diagram of the cultivation and management device 200.

The cultivation and management device 200 is a computer device including a processor 211, a main storage unit 212, an auxiliary storage unit 213, an input unit 214, an output unit 215, an external interface 216, a communication interface 217, and a bus 218.

The processor 211, the main storage unit 212, the auxiliary storage unit 213, the input unit 214, the output unit 215, the external interface 216, the communication interface 217, the bus 218, and a control unit 210 are the same as those described for the learning device 100, and thus detailed description will be omitted.

Here, the auxiliary storage unit 213 stores the trained learner 25 generated by the learning device 100.

FIG. 7(A) is a first functional block diagram of the cultivation and management device 200.

The cultivation and management device 200 includes at least an environment state information acquisition unit 220, a planned yield acquisition unit 221, and a calculation unit 223.

The environment state information acquisition unit 220 is a means for acquiring the environment state information that is information on the environment in which the cultivation target plant is placed. Here, the control unit 210 may acquire the environment state information input by the user via the input unit 214. In this case, the input unit 214 and the control unit 210 configure the environment state information acquisition unit 220. In addition, regarding the environment state information such as temperature, humidity, and illuminance inside the greenhouse 410 that can be detected by environment detection means such as a temperature sensor, a humidity sensor, and an illuminance sensor installed in the greenhouse, the control unit 210 may acquire the environment state information detected by the environment detection means such as the temperature/humidity sensor 413 installed in the greenhouse 410 from the controller 412 of the greenhouse 410 connected through the external interface 216. In this case, in the example in FIG. 4, the temperature/humidity sensor 413, the external interface 216 connected to the controller 412, and the control unit 210 configure the environment state information acquisition unit 220. Further, regarding the environment state information that can be acquired from an external server via the network, such as outside temperature and humidity, the control unit 210 may acquire the information from the external server via the network such as the Internet through the communication interface 217. In this case, the communication interface 217 and the control unit 210 configure the environment state information acquisition unit 220.

The planned yield acquisition unit 221 is a means for acquiring planned yield information that is information on a yield in a cultivation plan scheduled by the user. Here, the control unit 210 may acquire the planned yield information input by the user via the input unit 214. In this case, the input unit 214 and the control unit 210 configure the planned yield acquisition unit 221. Further, the control unit 210 may acquire the environment state information and the planned yield information input by the user from a mobile terminal such as a smartphone connected via the network 4 through the communication interface 217. In this case, the communication interface 217 and the control unit 210 configure the environment state information acquisition unit 220 and the planned yield acquisition unit 221. Further, the planned yield information previously input by the user via the input unit 214 may be stored in a predetermined area of the auxiliary storage unit 213, and the control unit 210 may read and acquire the information.

When the environment state information acquired by the environment state information acquisition unit 220 and the planned yield information acquired by the planned yield acquisition unit 221 are input, the calculation unit 223 of the cultivation and management device 200, using the above-mentioned trained leaner 25, can output to the output unit 215 information on the work including the shape change work as work instruction information 224 required for achieving the planned yield under the environment state specified by the environment state information. For example, the work instruction information 224 is displayed on a display as the output unit 215, or is printed out as a document from a printer as the output unit 215. The work instruction information 224 may also be transmitted to an external device through the external interface 216 or the communication interface 217. For example, a work detail (including quantity) may be transmitted through the communication interface 217 to a mobile terminal such as a worker's smartphone connected to the network. Here, the calculation unit 223 is configured with the control unit 210 that executes a calculation program.

FIG. 7(B) is a second functional block diagram of the cultivation and management device 200.

The cultivation and management device 200 includes at least the environment state information acquisition unit 220, a work history information acquisition unit 222, and the calculation unit 223. The same symbols are used for the same configuration as the first block diagram shown in FIG. 7(A) to omit detailed description thereof.

The work history information acquisition unit 222 is a means for acquiring work history information that quantifies a history of work performed by human on the cultivation target plant. Here, the control unit 210 may acquire the work history information input by the user via the input unit 214. In this case, the input unit 214 and the control unit 210 configure the work history information acquisition unit 222. Further, the control unit 210 may convert the information input by the user via the input unit 214 to acquire the work history information. Here, the control unit 210 functions as a quantification means. In this way, the user does not need to input the work history in the form of quantified work history information, and a burden of the user's input work is reduced. For example, the user selects a work type from a pull-down menu displayed on the display as the output unit 215, and selects a work amount from the work amount pull-down menu displayed according to the selected work type to enter the work history. For example, in the cultivation and management device 200, same as in the learning device 100, a work type flag corresponding to the selected work type (for example, when a work is flower picking, a flower picking flag) is set to on, and a numerical value (for example, 3) quantified based on the unit (here, quantity) specified according to the work type is acquired as the work history information. The work history information input by the user may be sequentially stored in a predetermined area of the auxiliary storage unit 213, and the control unit 210 may read and acquire the information from the area when the calculation unit 223 predicts a yield. Further, the control unit 210 may acquire the information from an external device through the external interface 216 or the communication interface 217. In this case, the external interface 216 or the communication interface 217 and the control unit 210 configure the work history information acquisition unit 222.

When the environment state information acquired by the environment state information acquisition unit 220 and the work history information acquired by the work history information acquisition unit 222 are input, the calculation unit 223 of the cultivation and management device 200, using the above-mentioned trained learner 25, can output to the output unit 215 a predicted yield as predicted yield information 225, based on the environment state specified by the environment state information and the work history up to that point. The predicted yield information 225 is, for example, displayed on a display as the output unit 215 or printed out as a document from a printer as the output unit 215. The work instruction information 224 may also be transmitted to an external device through the external interface 216 or the communication interface 217. For example, the predicted yield information 225 may be transmitted through the communication interface 217 to a mobile terminal such as an administrator's smartphone connected to the network. Here, the calculation unit 223 is configured with the control unit 210 that executes a calculation program.

The learner 25 that outputs a predicted yield as the predicted yield information 225, based on the environment state specified by the environment state information and the work history up to that point, can be generated by the same configuration and method as the learning device 100 shown in FIGS. 1 and 2 and the learning model generation method shown in FIG. 3. However, the learner 25 that outputs the predicted yield is a learning model generated using the training environment state information and the training work history information as the training data and the training yield information as the supervised data.

<Cultivation and Management Method>

Figure 8A:
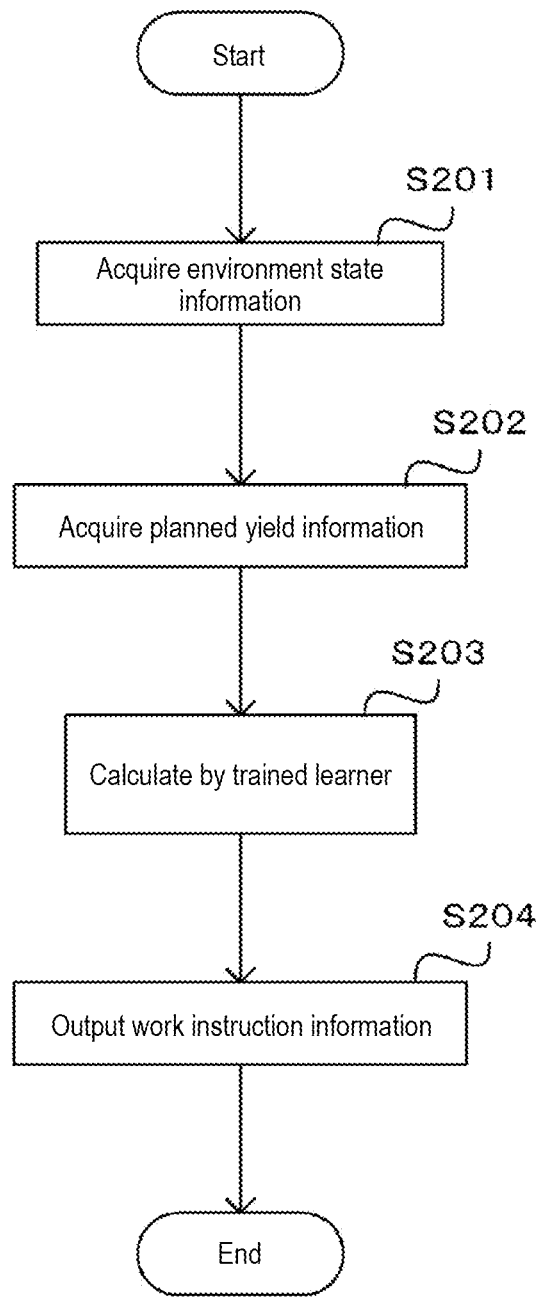
FIGS. 8(A) and 8(B) are flowcharts showing process steps of a cultivation and management method according to the first embodiment of the invention.

FIG. 8(A) is a flowchart showing process steps of the cultivation and management method. The cultivation and management method is executed as a cultivation and management program in the cultivation and management device 200.

First, the environment state information acquisition unit 220 acquires the environment state information (step S201).

Next, the planned yield acquisition unit 221 acquires the planned yield information (step S202).

Then, the calculation unit 223 inputs the environment state information and the planned yield information to the trained learner 25 to perform a calculation process (step S203).

A cultivation model that is the trained learner generated by the learning device 100 in advance is set as f (x1, x2). Here, x1 indicates the environment state information and x2 indicates the planned yield information (here, the input data is simplified for the sake of explanation).

Here, the work including the shape change work can be calculated by f (x1, x2), based on the environment state information (x1) acquired in step S201 and the planned yield information (x2) acquired in step S202. Specifically, in the case of a neural network, a work f (x1, x2), which is output, can be calculated by calculating a weight set to each connection between the nodes of each layer including the input layer having x1 and x2. In addition, in a statistical method, the work f (x1, x2) can be calculated by calculating a weight coefficient in a regression equation including inputs x1 and x2.

In this way, the work instruction information giving an instruction for necessary work is output through the calculation process, and the control unit 210 acquires (step S204) and outputs the information to, for example, the output unit 215.

In this way, the accuracy of cultivation work instruction is improved by using the learner that takes into account human intervention in the cultivation of the target plant. In addition, even when a worker has little knowledge and experience of the cultivation, the planned yield can be achieved by performing cultivation based on the work instruction.

Figure 8B:
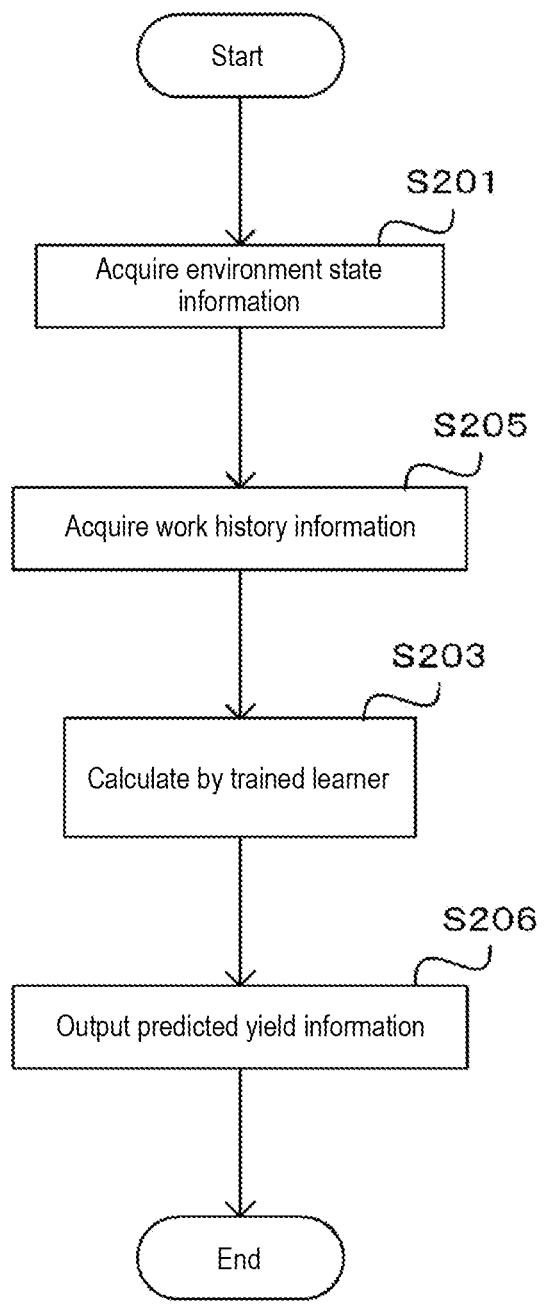

FIG. 8(B) is a flowchart showing the process steps of a yield prediction method as another cultivation and management method. The same symbols are used for the same processes as the cultivation and management method shown in FIG. 8(A) to omit description thereof. Here, the trained learner 25 used is trained using the environment state information and the work history information as the training data and the yield information as the supervised data. A yield prediction model configured with the above-mentioned trained learner 25 outputs the predicted yield by inputting the environment state information and the work history information.

First, the environment state information acquisition unit 220 acquires the environment state information (step S201).

Next, the work history information acquisition unit 222 acquires the work history information (step S205).

Then, the calculation unit 223 inputs the environment state information and the work history information to the trained learner 25 to perform a calculation process (step S203). Here, the predicted yield information 225 is output by the calculation process based on the environment state specified by the environment state information and the work history up to that point. Here, the yield can be calculated by g (x1, x3), based on the environment state information (x1) acquired in step S201 and the work history information (x3) acquired in step S205. Specifically, in the case of the neural network, a yield g (x1, x3), which is output, can be calculated by calculating a weight set to each connection between the nodes of each layer including the input layer having x1 and x2. In addition, in a statistical method, the yield g (x1, x3) can be calculated by calculating a weight coefficient in a regression equation including inputs x1 and x3.

In this way, the predicted yield information is output through the calculation process, and the control unit 210 acquires (step S206) and outputs the information to, for example, the output unit 215.

In this way, the accuracy of yield prediction is improved by using the learner that takes into account human intervention in the cultivation of the target plant.

Second Embodiment

Hereinafter, a learning device 500 and cultivation and management devices 600 and 700 according to the second embodiment will be described.

First is described a process of generating, through training, a model used for cultivation management.

<Device Configuration>

Since a hardware configuration of the learning device 500 according to the second embodiment is the same as the hardware configuration of the learning device 100 according to the first embodiment shown in FIG. 1, the description thereof will be omitted.

Figure 9:
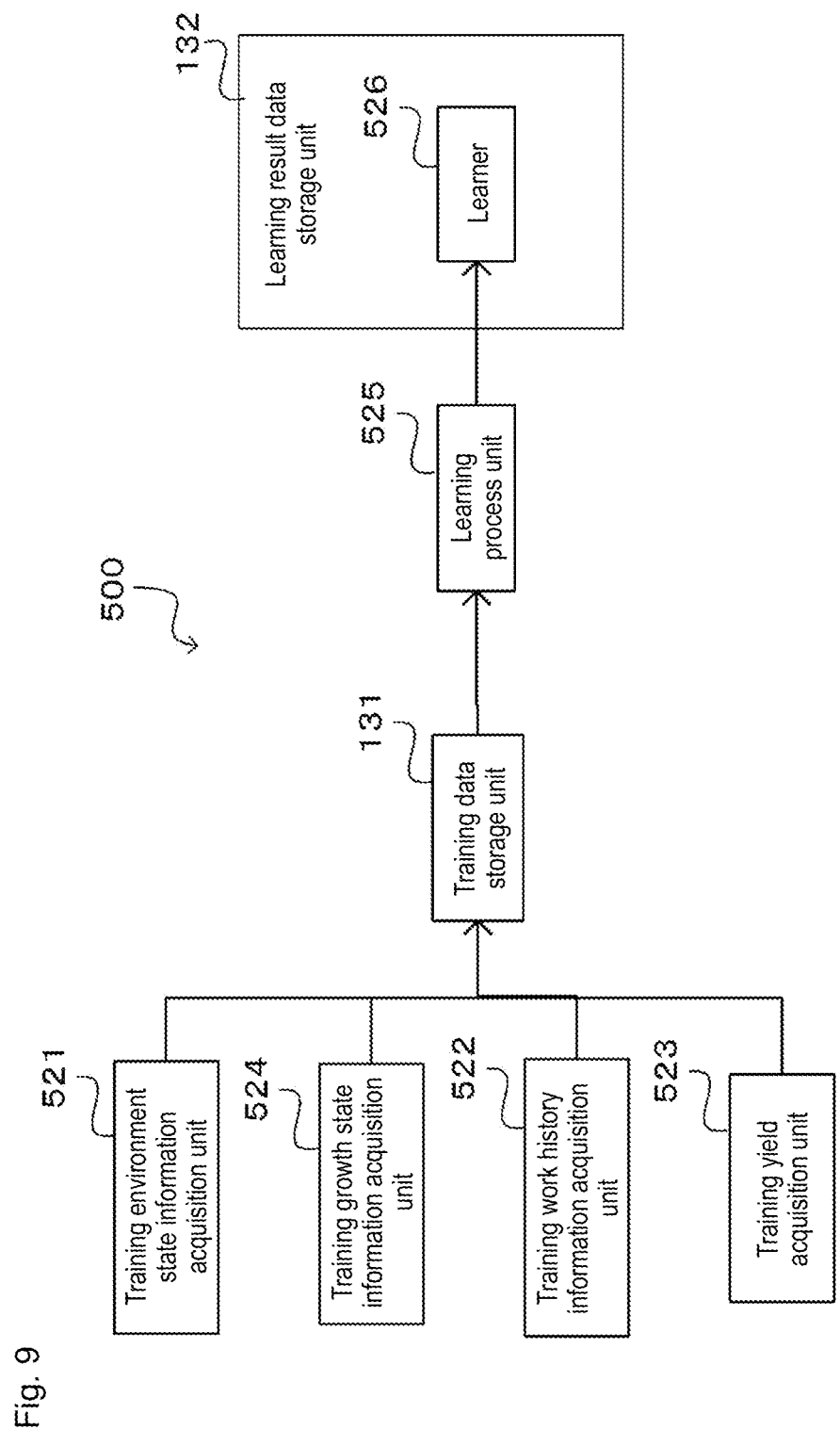
FIG. 9 is a functional block diagram of a learning device according to a second embodiment of the invention.

FIG. 9 is a functional block diagram of the learning device 500. The same symbols are used for the configurations common to the learning device 100 shown in FIG. 1 to omit description thereof.

The learning device 500 includes a training environment state information acquisition unit 521, a training work history information acquisition unit 522, a training yield acquisition unit 523, and a training growth state information acquisition unit 524.

The training growth state information acquisition unit 524 is a means for acquiring growth state information that is information on a growth state of a cultivation target plant itself. The growth state information is, for example, a sap flow rate measured by a sap flow sensor, an amount of absorbed nutrients measured by an absorbed nutrient sensor, and the like, and is information on the growth state that can be measured and detected from the plant itself. In addition, the growth state information includes a tree vigor detected by analyzing, using an image analysis means, an image of the cultivation target plant taken by an imaging device such as a camera. Here, the sap flow sensor, the absorbed nutrient sensor, the imaging device, and the image analysis means configure a growth state detecting means. Further, the growth state information as training data is referred to as training growth state information.

As described above, regarding information that can be measured and detected by the growth state detection means such as the sap flow sensor and the absorbed nutrient sensor, the control unit 10 may control these growth state detection means through the external interface 16 to acquire the growth state information. In this case, the external interface 16 and the control unit 10 connected to the growth state detecting means configure the training growth state information acquisition unit 524. The training growth state information that has already been measured, detected, and stored in the external device may also be acquired. In this case, the external interface 16 or the communication interface 17 connected to the external device configures the training growth state information acquisition unit 524. Further, the processor 11 that executes a predetermined program may acquire the training growth state information input by the user via the input unit 14. In this case, the input unit 14 and the control unit 10 configure the training growth state information acquisition unit 524.

As described above, the training data according to the second embodiment includes the training growth state information in addition to the training environment state information, training work history information, and training yield information. These pieces of training data are stored in the training data storage unit 131 that is a predetermined area of the auxiliary storage unit 13.

Here, the training growth state information is also associated in chronological order with respect to the cultivation target plant together with the training environment state information, the training work history information, and the training yield information. In addition, these pieces of information may be acquired for each stem of the cultivation target plant, or may be collectively acquired for a group of stems cultivated in a predetermined plot or a predetermined greenhouse. Corresponding to each case, the training environment state information, the training work history information, the training yield information, and the training growth state information are associated with each other by information that identifies each stem or the group of stems.

A learning process unit 525 performs machine learning of the learner so as to output an output value corresponding to work information when the training environment state information, the training growth state information, and the training yield information stored in the training data storage unit 131 are input. The learning process unit 525 performs machine learning by executing by the control unit 10 a learning model generation program stored in a predetermined area of the auxiliary storage unit 13. Here, for example, the learner is a model that predicts a work required for achieving a target yield by using the training environment state information, the training growth state information, and the training yield information as training data, and the training work history information as supervised data. For example, the program may calculate the model by a neural network, but is not limited to this. For example, the model can be calculated by work including shape change work h (x1, x2, x4) based on training environment state information (x1), training yield information (x2), and training growth state information (x4). Specifically, in the case of the neural network, model h (x1, x2, x4) can be obtained by adjusting a weight of each connection between the nodes of each layer including the input layer having x1, x2, and x4 to minimize error function with work h (x1, x2, x4), which is output, and training work history information (x3). In addition, in a statistical method, the model h (x1, x2, x4) can be obtained by calculating a weight coefficient in a regression equation including inputs x1, x2, and x4 by the least-square method or the like.

By repeating machine learning of the learner in the learning process unit 525 using a large amount of training data, a trained learner 526 is obtained. The trained learner 526 obtained in this way is stored in the learning result data storage unit 132, which is a predetermined area of the auxiliary storage unit 13.

<Learning Model Generation Method>

Figure 10:
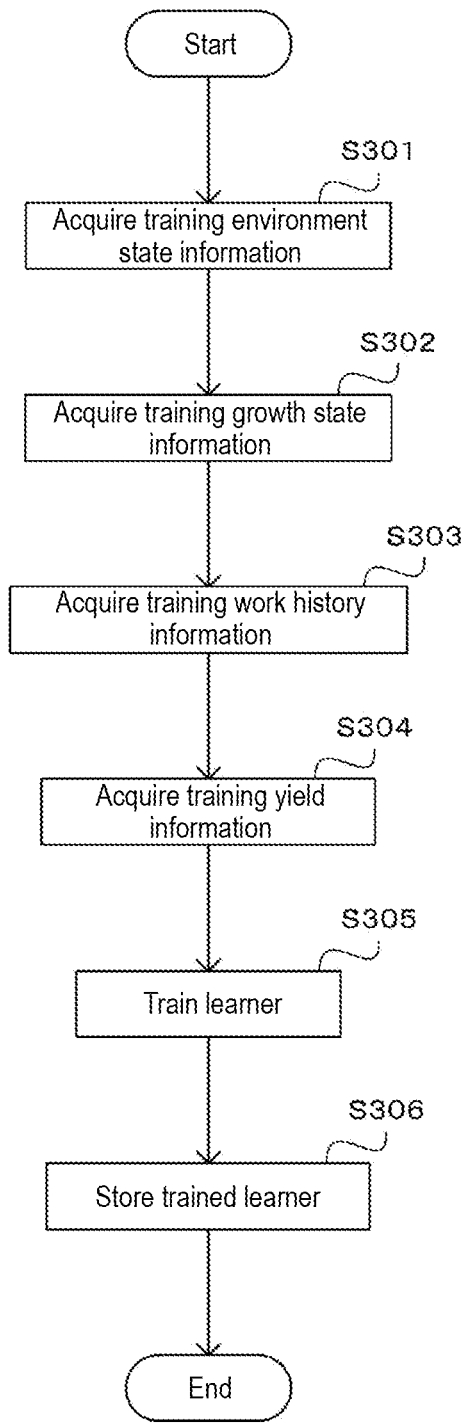
FIG. 10 is a flowchart showing process steps of a learning model generation method according to the second embodiment of the invention.

FIG. 10 is a flowchart showing process steps of the learning model generation method. The learning model generation method is executed as a learning model generation program in the learning device 500.

First, the training environment state information acquisition unit 521 acquires the training environment state information (step S301).

Next, the training growth state information acquisition unit 524 acquires the training growth state information (step S302).

Next, the training work history information acquisition unit 522 acquires the training work history information (step S303).

Next, the training yield acquisition unit 523 acquires the training yield information (step S304).

Then, the learning process unit 525 trains the above-mentioned learner by using the acquired training environment state information, training growth state information, and training yield information as the input data and training work history information as the supervised data (step S305). Since the learning process of the learner is the same as that of the first embodiment, detailed description thereof will be omitted.

By repeating the process from step S301 to step S305 for a large amount of training data, the trained learner 526 is output from the learning process unit 525. The control unit 10 acquires and stores the trained learner 526 in the learning result data storage unit 132 (step S306).

In this way, the learner capable of giving appropriate work instructions is generated, taking into account human intervention in cultivation of the target plant.

Next, a process of cultivation management based on inference using the model generated by training will be described.

<Cultivation and Management System>

Figure 11:
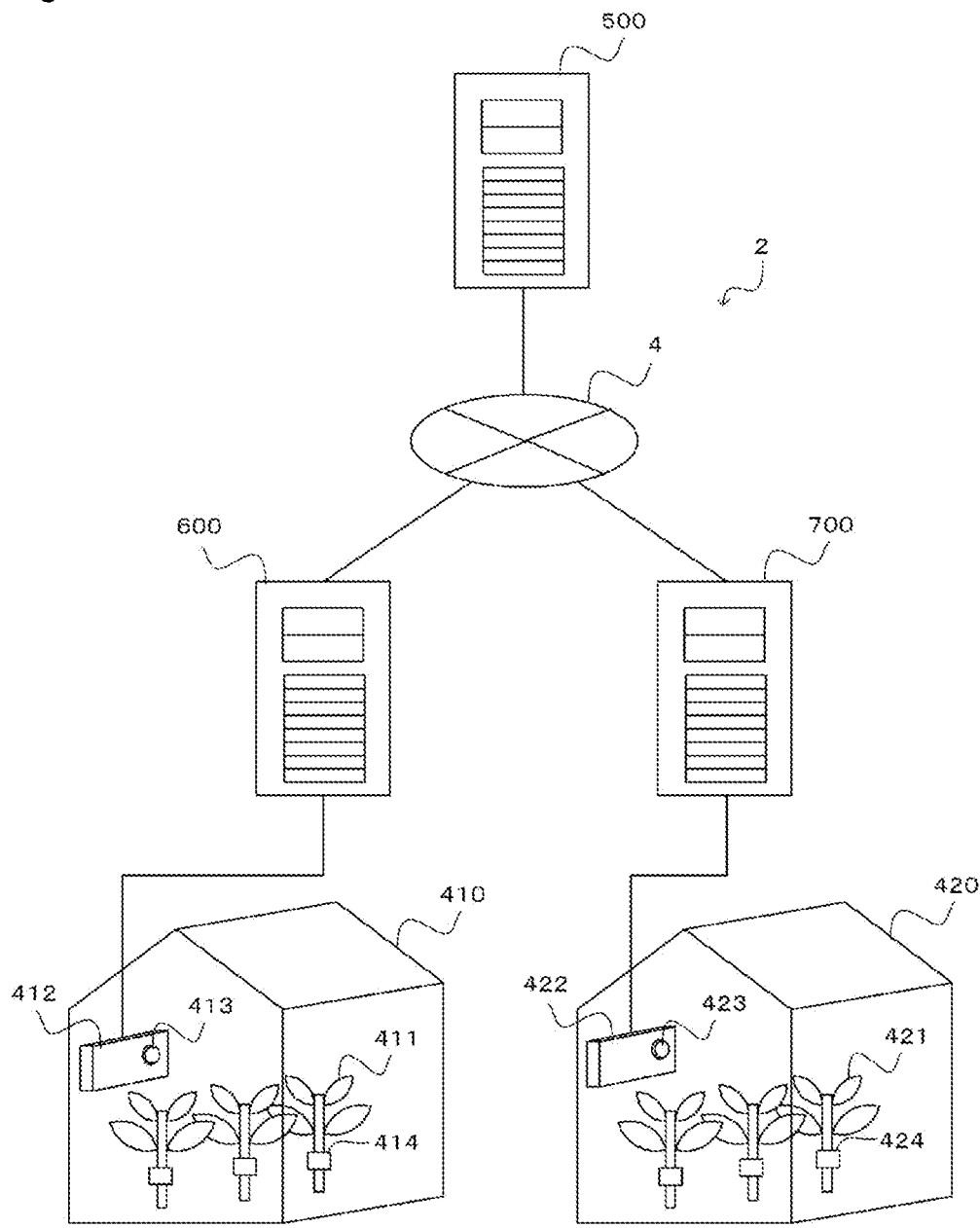
FIG. 11 is a schematic configuration diagram of a cultivation and management system according to the second embodiment of the invention.

FIG. 11 is a schematic diagram showing a schematic configuration of a cultivation and management system 2 including the learning device 500 and the cultivation and management devices 600 and 700 according to the second embodiment.

The learning device 500, the cultivation and management device 600, and the cultivation and management device 700 are connected via a network. The cultivation and management device 600 is connected to the controller 412 of the greenhouse 410 in which plants are cultivated. The cultivation and management device 700 is also connected to the controller 422 of the greenhouse 420 in which plants are cultivated similarly. Hereinafter, the cultivation and management device 600 will be described, but the same applies to the cultivation and management device 700. Further, the cultivation and management device 600 is not limited to a case where it is connected to the controller 412 of one greenhouse 410, and may be connected to controllers of a plurality of greenhouses. The learner 526 generated in the learning device 500 is transmitted to the cultivation and management devices 600 and 700 via the network 4. Further, the cultivation and management devices 600 and 700 transmit the training environment state information, the training work history information, the training yield information, and the training growth state information to the learning device 500 via the network 4. By configuring the cultivation and management system with the learning device 500 and the cultivation and management devices 600 and 700, training data can be collected from the cultivation and management devices 600 and 700 to further train the learner to improve its performance. Then, by providing an updated learner to the cultivation and management devices 600 and 700, more accurate cultivation becomes possible.

Here, a sap flow sensor 414 is provided as the growth state detecting means for measuring a sap flow rate of the plant 411 to be cultivated. The sap flow sensor 414 is connected to the controller 412, and the sap flow rate measured by the sap flow sensor 414 is transmitted to the cultivation and management device 600 via the controller 412 and acquired as the growth state information. The plant 421 in the greenhouse 420 is also provided with a sap flow sensor 424 connected to the controller 422.

Since a hardware configuration of the cultivation and management device 600 according to the second embodiment is the same as that of the cultivation and management device 200 according to the first embodiment shown in FIG. 5, the same symbols are used to omit detailed description thereof.

Figure 12A:
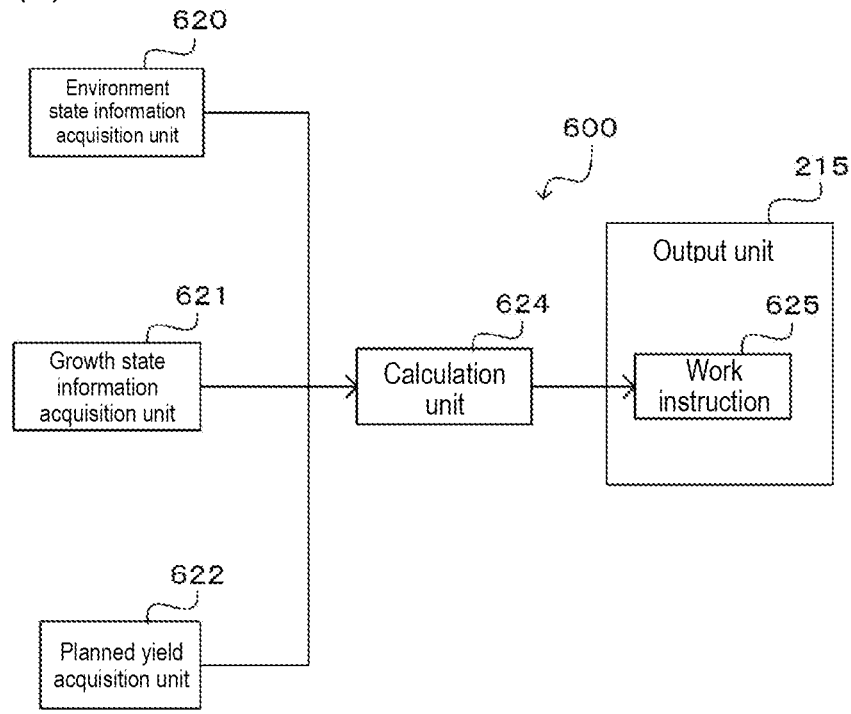
FIGS. 12(A) and 12(B) are functional block diagrams of a cultivation and management device according to the second embodiment of the invention.

FIG. 12(A) is a first functional block diagram of the cultivation and management device 600 according to the second embodiment.

The cultivation and management device 600 includes at least an environment state information acquisition unit 620, a growth state information acquisition unit 621, a planned yield acquisition unit 622, and a calculation unit 624.

The environment state information acquisition unit 620 is a means for acquiring environment state information that is information on the environment under which the cultivation target plant is placed. Here, the control unit 210 may acquire the environment state information input by the user via the input unit 214. In this case, the input unit 214 and the control unit 210 configure the environment state information acquisition unit 620. In addition, with respect to the environment state information such as temperature, humidity, and illuminance inside the greenhouse that can be detected by environment detection means such as a temperature sensor, a humidity sensor, and an illuminance sensor installed in the greenhouse, the control unit 210 may acquire the environment state information detected by the environment detection means such as the temperature/humidity sensor 413 installed in the greenhouse 410 from the controller 412 of the greenhouse 410 connected through the external interface 216. In this case, in the example in FIG. 11, the temperature/humidity sensor 413 and the external interface 216 connected to the controller 412 configure the environment state information acquisition unit 620. Further, regarding the environment state information that can be acquired from an external server via the network, such as outside temperature and humidity, the control unit 210 may acquire the information from the external server via the network such as the Internet through the communication interface 217. In this case, the communication interface 217 and the control unit 210 configure the environment state information acquisition unit 620.

The growth state information acquisition unit 621 is a means for acquiring growth state information that is information on a growth state of the cultivation target plant itself. The growth state information is, for example, a sap flow rate measured by a sap flow sensor, an amount of absorbed nutrients measured by an absorbed nutrient sensor, and the like, and is information on the growth state that can be measured and detected from the plant itself. In addition, the growth state information includes a tree vigor detected by analyzing, using an image analysis means, an image of the cultivation target plant taken by an imaging device such as a camera. Here, the sap flow sensor, the absorbed nutrient sensor, the imaging device, and the image analysis means configure a growth state detecting means.

As described above, regarding information that can be measured and detected by the growth state detection means such as the sap flow sensor and the absorbed nutrient sensor, the control unit 210 may control these growth state detection means through the external interface 216 to acquire the growth state information. In this case, the external interface 216 connected to the growth state detecting means configures the growth state information acquisition unit 621. The growth state information that has already been measured, detected, and stored in the external device may also be acquired. In this case, the external interface 216 or the communication interface 217 connected to the external device configures the growth state information acquisition unit 621. The control unit 210 may also acquire the growth state information input by the user via the input unit 214. In this case, the input unit 214 and the control unit 210 configure the growth state information acquisition unit 621.

The work history information acquisition unit 623 is a means for acquiring work history information that quantifies a history of work performed by human on the cultivation target plant. Here, the control unit 210 may acquire the work history information input by the user via the input unit 214. In this case, the input unit 214 and the control unit 210 configure the work history information acquisition unit 623. Further, the control unit 210 may convert the information input by the user via the input unit 214 to acquire the work history information. Here, the control unit 210 functions as a quantification means. In this way, the user does not need to input the work history in the form of quantified work history information, and a burden of the user's input work is reduced. For example, the user selects a work type from a pull-down menu displayed on the display as the output unit 215, and selects a work amount from the work amount pull-down menu displayed according to the selected work type to enter the work history. For example, in the cultivation and management device 600, same as in the learning device 500, a work type flag corresponding to the selected work type (for example, when a work is flower picking, a flower picking flag) is set to on, and a numerical value (for example, 3) quantified based on the unit (here, quantity) specified according to the work type is acquired as the training work history information. The work history information input by the user may be sequentially stored in a predetermined area of the auxiliary storage unit 213, and the control unit 210 may read and acquire the information from the area when the calculation unit 624 predicts a yield. Further, the control unit 210 may acquire the information from an external device through the external interface 216 or the communication interface 217. In this case, the external interface 216 or the communication interface 217 and the control unit 210 configure the work history information acquisition unit 623.

The planned yield acquisition unit 622 is a means for acquiring the planned yield information that is information on a yield in a cultivation plan scheduled by the user. Here, the control unit 210 may acquire the planned yield information input by the user via the input unit 214. In this case, the input unit 214 and the control unit 210 configure the planned yield acquisition unit 622. Further, the planned yield information previously input by the user via the input unit 214 may be stored in a predetermined area of the auxiliary storage unit 213, and the control unit 210 may read the information.

When the environment state information acquired by the environment state information acquisition unit 620, the growth state information acquired by the growth state information acquisition unit 621, and the planned yield information acquired by the planned yield acquisition unit 622 are input to, the calculation unit 624 of the cultivation and management device 600, using the above-mentioned learner 526, the calculation unit 624 can output to the output unit 215 work instruction information 625 on the work including the shape change work required for achieving the planned yield under the environment state specified by the environment state information and the growth state specified by the growth state information. The work instruction information 625 is, for example, displayed on a display as the output unit 215, or is printed out as a document from a printer as the output unit 215. The work instruction information 224 may also be transmitted to an external device through the external interface 216 or the communication interface 217. Here, the calculation unit 624 is configured with the control unit 210 that executes a calculation program.

Figure 12B:
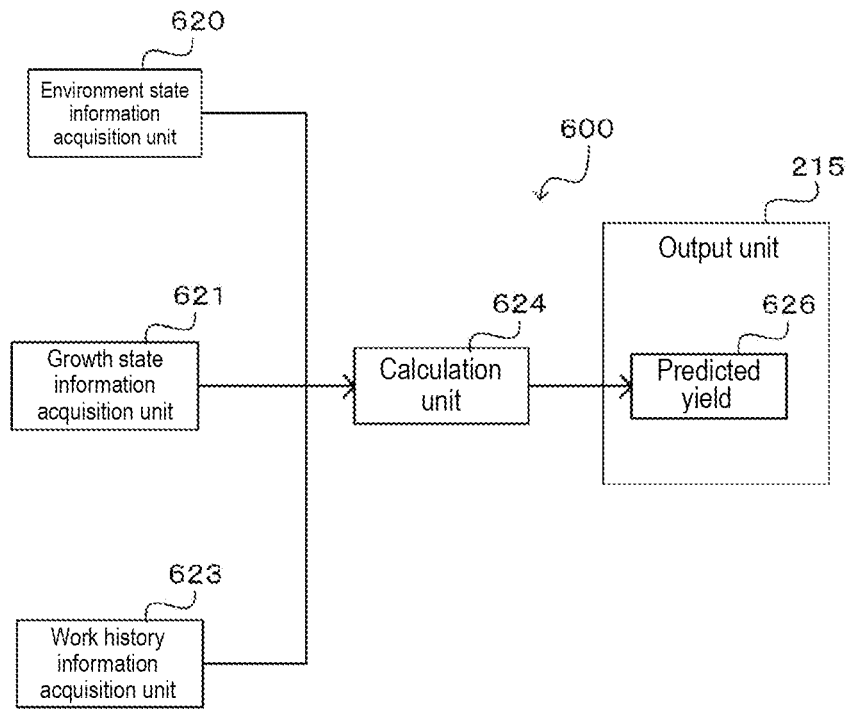

FIG. 12(B) is a second functional block diagram of the cultivation and management device 600 according to the second embodiment.

The cultivation and management device 600 includes at least the environment state information acquisition unit 620, the growth state information acquisition unit 621, the work history information acquisition unit 623, and the calculation unit 624. The same symbols are used for the same configurations as the first functional block diagram shown in FIG. 12(A) to omit detailed description thereof.

The work history information acquisition unit 623 is a means for acquiring work history information that quantifies a history of work performed by human on the cultivation target plant. Here, the control unit 210 may acquire the work history information input by the user via the input unit 214. In this case, the input unit 214 and the control unit 210 configure the work history information acquisition unit 623. Further, the control unit 210 may convert the information input by the user via the input unit 214 to acquire the work history information. Here, the control unit 210 functions as a quantification means. In this way, the user does not need to input the work history in the form of quantified work history information, and a burden of the user's input work is reduced. For example, the user selects a work type from a pull-down menu displayed on the display as the output unit 215, and selects a work amount from the work amount pull-down menu displayed according to the selected work type to enter the work history. For example, in the cultivation and management device 600, same as in the learning device 500, a work type flag corresponding to the selected work type (for example, when a work is flower picking, a flower picking flag) is set to on, and a numerical value (for example, 3) quantified based on the unit (here, quantity) specified according to the work type is acquired as the training work history information. The work history information input by the user may be sequentially stored in a predetermined area of the auxiliary storage unit 213, and the control unit 210 may read and acquire the information from the area when the calculation unit 624 predicts a yield. Further, the control unit 210 may acquire the information from an external device through the external interface 216 or the communication interface 217. In this case, the external interface 216 or the communication interface 217 and the control unit 210 configure the work history information acquisition unit 623.

When the environment state information acquired by the environment state information acquisition unit 620, the growth state information acquired by the growth state information acquisition unit 621, and the work history information acquired by the work history information acquisition unit 623 are input to the above-mentioned learner 526, the calculation unit 624 of the cultivation and management device 600 can output to the output unit 215 predicted yield information 626 based on the environment state specified by the environment state information, the growth state specified by the growth state information, and the work history up to that point. The predicted yield information 626 is, for example, displayed on a display as the output unit 215 or printed out as a document from a printer as the output unit 215. The work instruction information 224 may also be transmitted to an external device through the external interface 216 or the communication interface 217. Here, the calculation unit 624 is configured with the control unit 210 that executes a calculation program.

<Cultivation and Management Method>

Figure 13A:
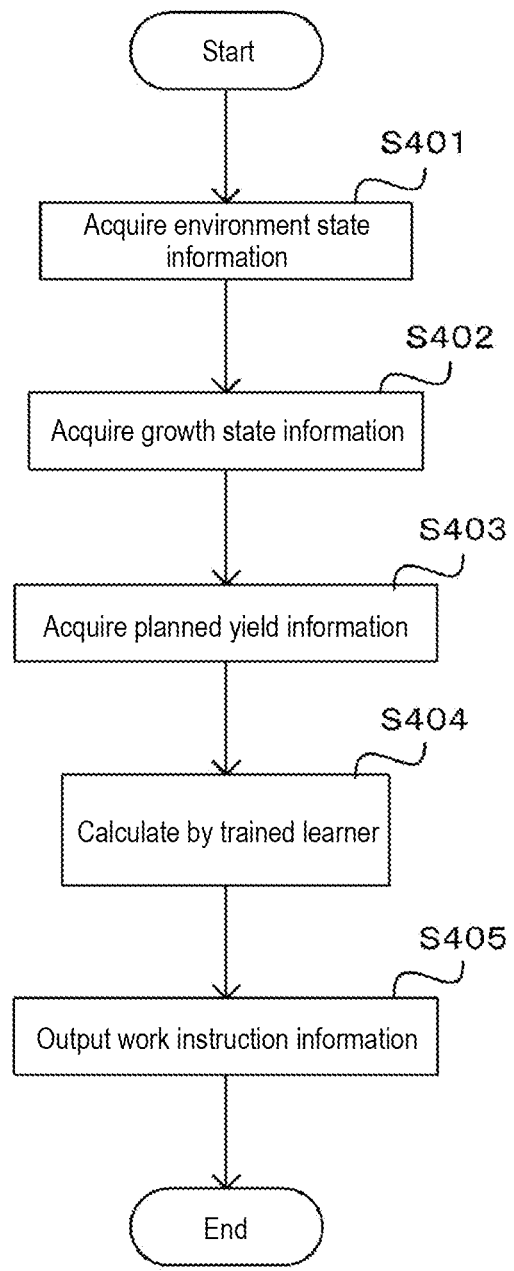
FIGS. 13(A) and 13(B) are flowcharts showing process steps of a cultivation and management method according to the second embodiment of the invention.

FIG. 13(A) is a flowchart showing process steps of the cultivation and management method. The cultivation and management method is executed as a cultivation and management program in the cultivation and management device 600.

First, the environment state information acquisition unit 620 acquires the environment state information (step S401).

Next, the growth state information acquisition unit 621 acquires the growth state information (step S402).

Next, the planned yield acquisition unit 622 acquires the planned yield information (step S403).

Then, the calculation unit 624 inputs the environment state information, the growth state information, and the planned yield information to the trained learner 526 to perform the calculation process (step S404).

Then, the calculation unit 624 outputs, through the calculation process, the work instruction information 625 that gives an instruction for the work including the shape change work necessary for achieving the planned yield under the environment state and the growth state specified by the environment state information and the growth state information that have been input. The control unit 210 acquires and outputs the information to, for example, the output unit 215 (step S405). Since the calculation process of the work instruction information 625 is the same as that in the first embodiment, detailed description thereof will be omitted.

In this way, the accuracy of cultivation work instruction is improved by using the learner that takes into account human intervention in the cultivation of the target plant. In addition, even when a worker has little knowledge and experience of the cultivation, the planned yield can be achieved by performing cultivation based on the work instruction.

Figure 13B:
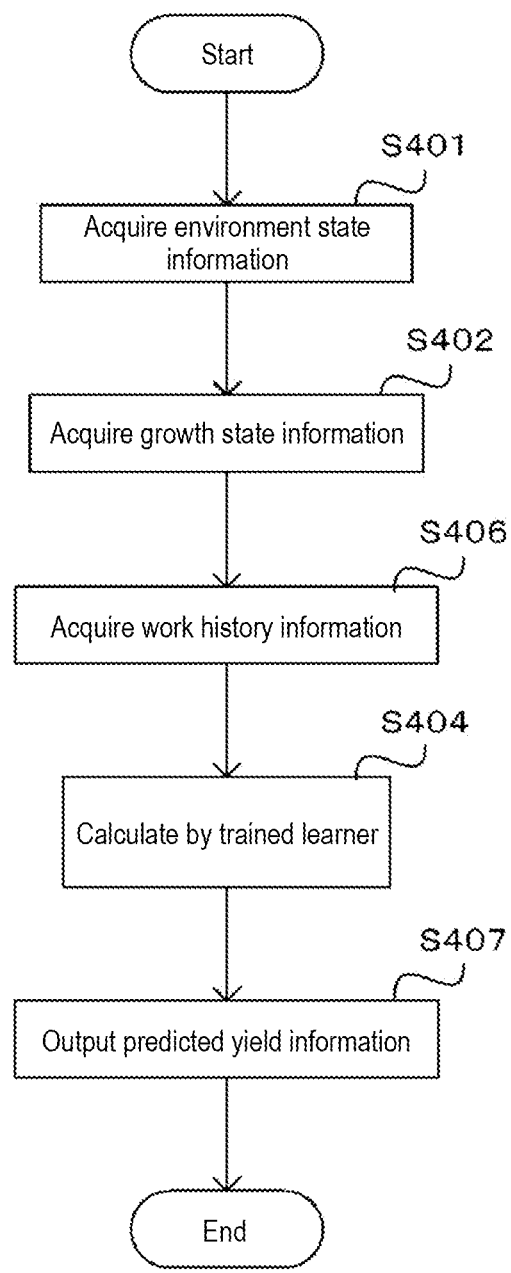

FIG. 13(B) is a flowchart showing the process steps of the yield prediction method as another cultivation and management method. The same symbols are used for the same processes as the cultivation and management method shown in FIG. 13(A) to omit description thereof.

First, the environment state information acquisition unit 620 acquires the environment state information (step S401).

Next, the growth state information acquisition unit 621 acquires the growth state information (step S402).

Next, the work history information acquisition unit 623 acquires the work history information (step S406).

Then, the calculation unit 624 inputs the environment state information, the growth state information, and the work history information to the trained learner 526 to perform the calculation process (step S404).

Then, the calculation unit 624 outputs, through the calculation process, the predicted yield information 626 based on the environment state and the growth state specified by the environment state information and the growth state information that have been input and the work history up to that point. The control unit 210 acquires and outputs the information to, for example, the output unit 215 (step S407).

In this way, the accuracy of yield prediction is improved by using the learner that takes into account human intervention in the cultivation of the target plant.

Third Embodiment

Hereinafter, a learning device 800 and cultivation and management devices 900 and 1000 according to the third embodiment will be described.

Since a hardware configuration, functional blocks, and learning model generation method of the learning device 800 according to the third embodiment are the same as those of the second embodiment, the same symbols are given to a process of generating a model used for cultivation management through training to omit detailed description thereof. Next, a process of cultivation management based on inference using the model generated by training will be described below.

<Cultivation and Management System>

Figure 14:
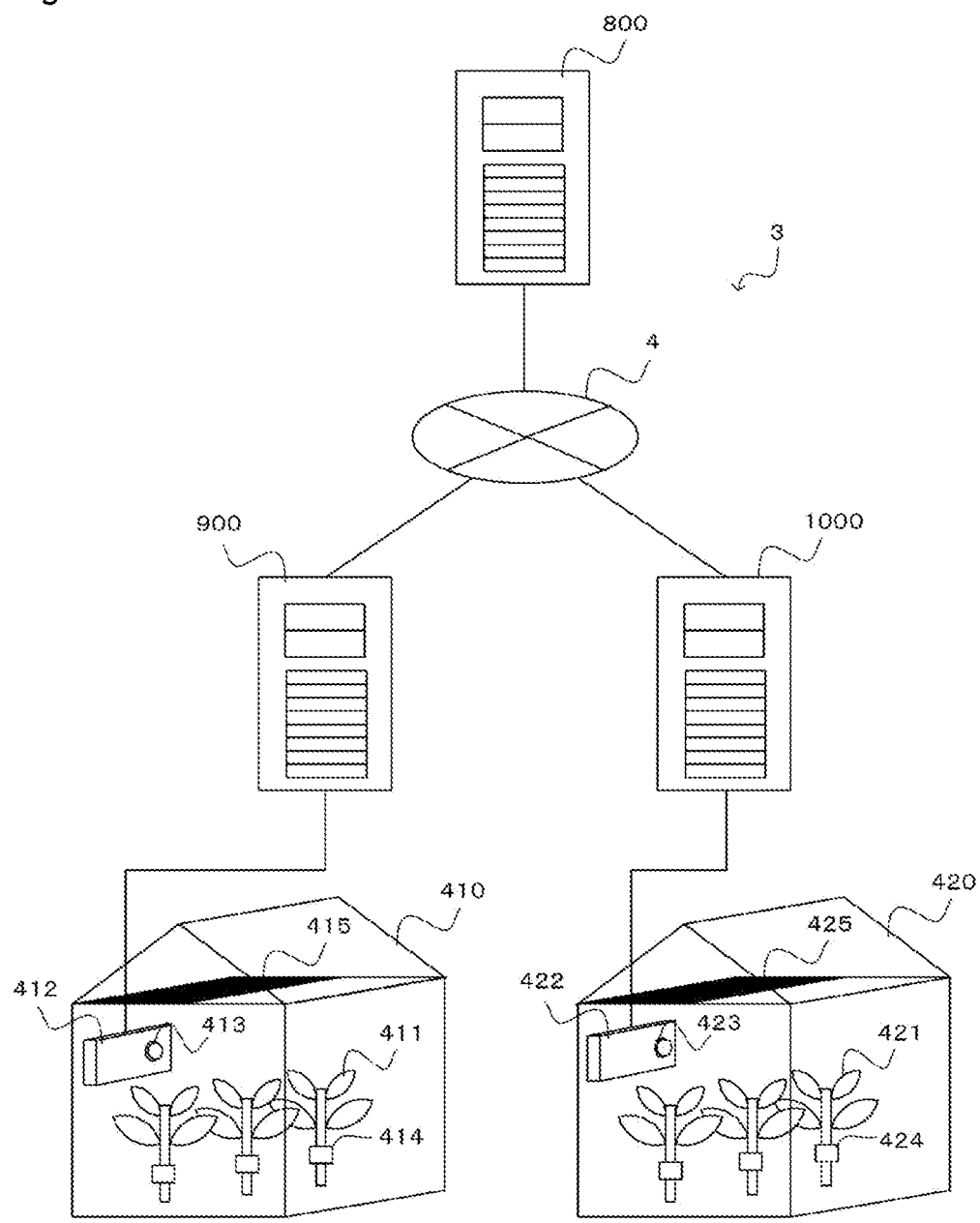
FIG. 14 is a schematic configuration diagram of a cultivation and management system according to a third embodiment of the invention.

FIG. 14 is a schematic diagram showing a schematic configuration of a cultivation and management system 3 including the learning device 800 and the cultivation and management devices 900 and 1000 according to the third embodiment.

The learning device 800, the cultivation and management device 900, and the cultivation and management device 1000 are connected via the network 4. The cultivation and management device 900 is connected to the controller 412 of the greenhouse 410 in which the plant 411 will be cultivated. The cultivation and management device 1000 is also connected to the controller 422 of the greenhouse 420 in which the plant 421 is cultivated. Hereinafter, the cultivation and management device 900 will be described, but the same applies to the cultivation and management device 1000. Further, the cultivation and management device 900 is not limited to a case where it is connected to the controller 412 of one greenhouse 410, and may be connected to controllers of a plurality of greenhouses. The learner 526 generated in the learning device 800 is transmitted to the cultivation and management devices 900 and 1000 via the network 4. Further, the cultivation and management devices 900 and 1000 transmit the training environment state information, the training work history information, and the training yield information to the learning device 800 via the network 4. By configuring the cultivation and management system with the learning device 800 and the cultivation and management devices 900 and 1000, training data can be collected from the cultivation and management devices 900 and 1000 to further train the learner to improve its performance. Then, by providing an updated learner to the cultivation and management devices 900 and 1000, more accurate cultivation becomes possible.

Here, a light-shielding curtain 415 is provided as an environment state control means that controls an amount of solar radiation to the cultivation target plant by adjusting an opening degree. The light-shielding curtain 415 is connected to the controller 412, and the opening degree is controlled based on state control instruction information transmitted from the cultivation and management device 900. Accordingly, the amount of solar radiation directed to the plant is controlled. The greenhouse 420 is also provided with a light-shielding curtain 425 connected to the controller 422.

Since a hardware configuration of the cultivation and management device 900 according to the third embodiment is the same as that of the cultivation and management device 200 according to the first embodiment shown in FIG. 6, the same symbols are given to omit detailed description thereof.

Figure 15A:
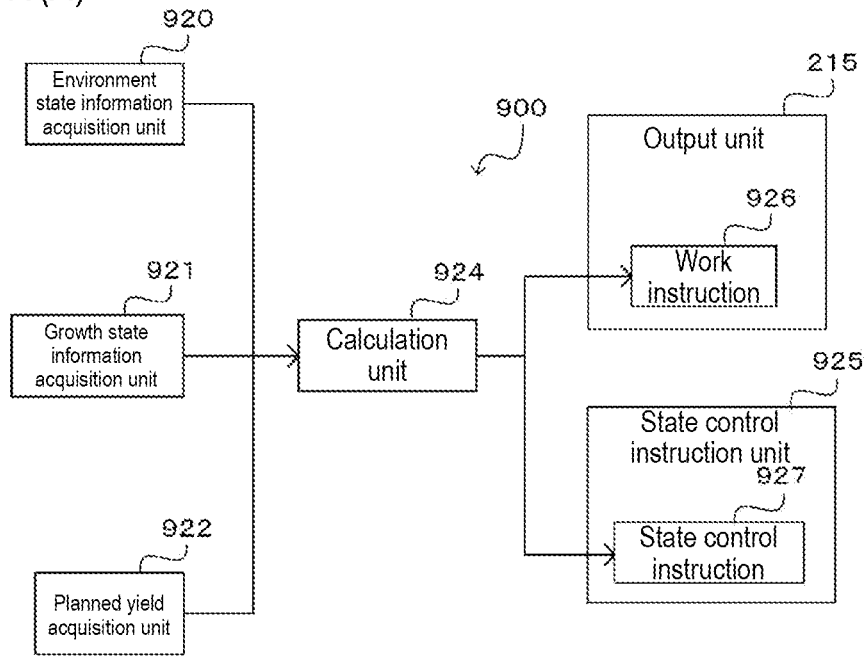
FIGS. 15(A) and 15(B) are functional block diagrams of a cultivation and management device according to the third embodiment of the invention.

FIG. 15(A) is a first functional block diagram of the cultivation and management device 900.

The cultivation and management device 900 includes at least an environment state information acquisition unit 920, a growth state information acquisition unit 921, a planned yield acquisition unit 922, a calculation unit 924, and a state control instruction unit 925.

The calculation unit 924 inputs to the trained learner 526 the environment state information acquired by the environment state information acquisition unit 920, the growth state information acquired by the growth state information acquisition unit 921, and the planned yield acquired by the planned yield acquisition unit 922, and outputs to the output unit 215 work instruction information 926 and also outputs to the state control instruction unit 925 state control instruction information 927.

The control unit 210 acquires the state control instruction information 927, and the state control instruction unit 925 transmits to the controller 412 connected through the external interface 216 information for giving an instruction for the control of a state control means (for example, light-shielding curtain 415) that controls the environment state and the growth state in the greenhouse 410.

Here, the state control means includes environment state control means that controls the environment state such as a heater/humidifier that controls a temperature and humidity, which is the environment state under which the cultivation target plant is placed, a light-shielding curtain that controls the amount of solar radiation, and a carbon dioxide generator that controls an amount of carbon dioxide. In addition, the state control means includes growth state control means that controls the growth state such as a fertilizer that controls nutrients in the soil that affect an amount of absorbed nutrients of plants and an irrigation device that controls a water content in the soil that affects a sap flow rate.

Figure 16A:
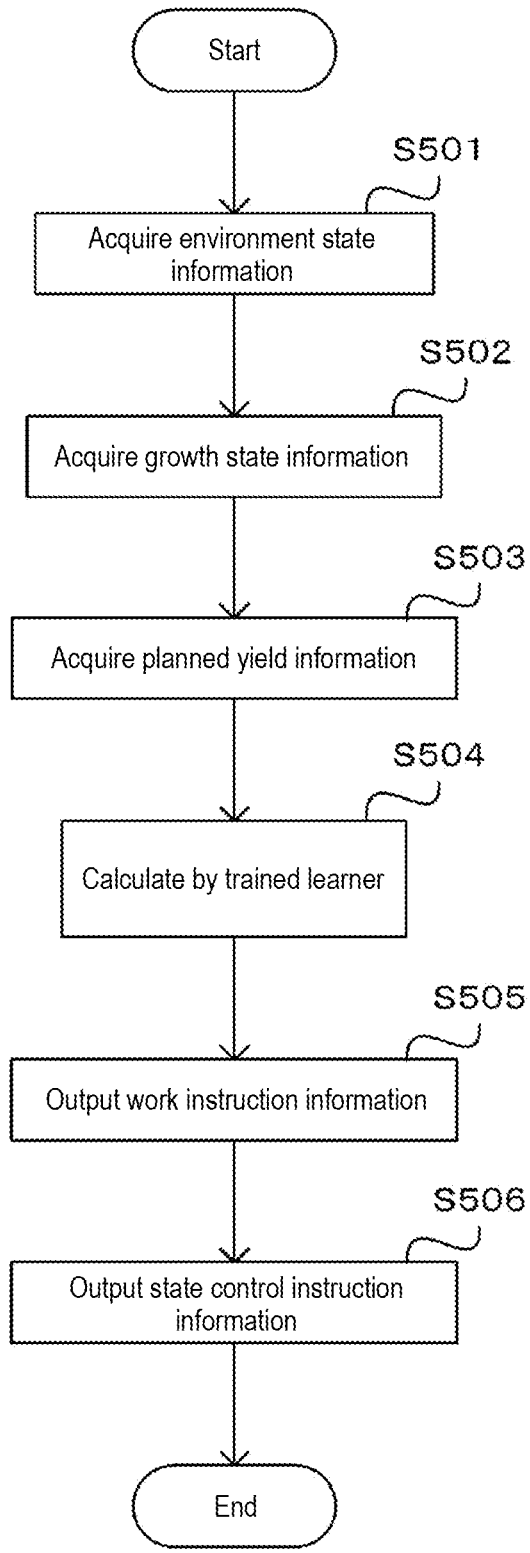
FIGS. 16(A) and 16(B) are flowcharts showing process steps of a cultivation and management method according to the third embodiment of the invention.

FIG. 16(A) is a flowchart showing process steps of the cultivation and management method. This cultivation and management method is executed as a cultivation and management program in the cultivation and management device 900.

First, the environment state information acquisition unit 920 acquires the environment state information (step S501).

Next, the growth state information acquisition unit 921 acquires the growth state information (step S502).

Next, the planned yield acquisition unit 922 acquires the planned yield information (step S503).

Then, the calculation unit 924 inputs the environment state information, the growth state information, and the planned yield information to the trained learner 526 to perform the calculation process (step S504).

Then, the calculation unit 924 outputs, through the calculation process in step S505, the work instruction information 926 (step S505) that gives an instruction for the work including the shape change work necessary for achieving the planned yield and the state control instruction information 927 (step S506) based on the environment state and the growth state specified by the environment state information and the growth state information that have been input. Since the calculation process of the necessary work instruction information and the state control instruction information is the same as that in the first embodiment, detailed description thereof will be omitted. The control unit 210 acquires the work instruction information 926 and outputs it, for example, to the output unit 215, and also acquires the state control instruction information 927 and outputs it, for example, to the state control instruction unit 925.

In this way, by using a learning device that takes into account human intervention in the cultivation of the target plant, the accuracy of instructions for cultivation work is improved and the accuracy of instructions for controlling environmental conditions and growth conditions is improved. In addition, even when a worker has little knowledge and experience of the cultivation, the planned yield can be achieved by performing cultivation based on the work instruction.

Figure 15B:
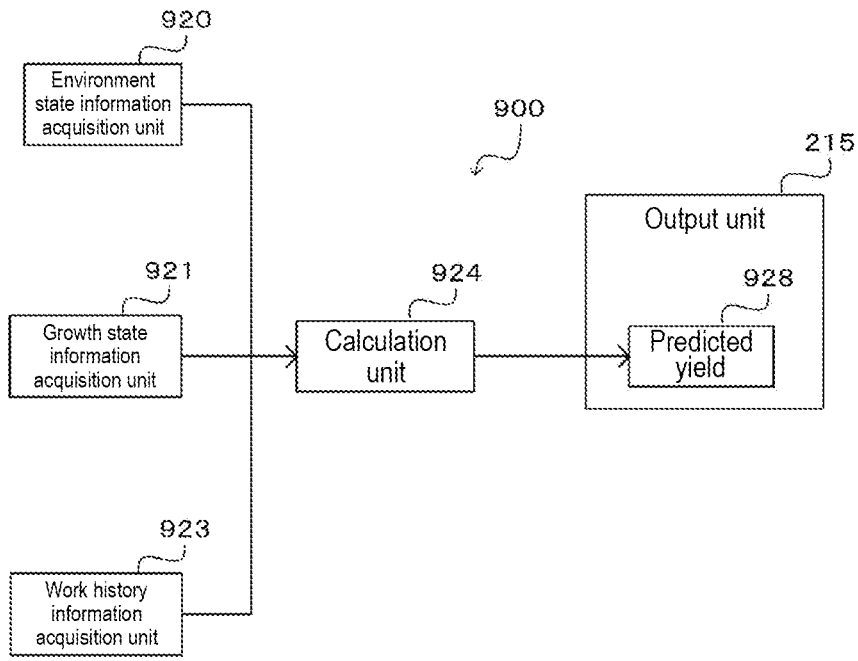

FIG. 15(B) is a second functional block diagram of the cultivation and management device 900.

The cultivation and management device 900 includes at least the environment state information acquisition unit 920, the growth state information acquisition unit 921, a work history information acquisition unit 923, and the calculation unit 924. The same symbols are used for the same configurations as those in the first block diagram shown in FIG. 15(A) to omit description thereof.

Figure 16B:
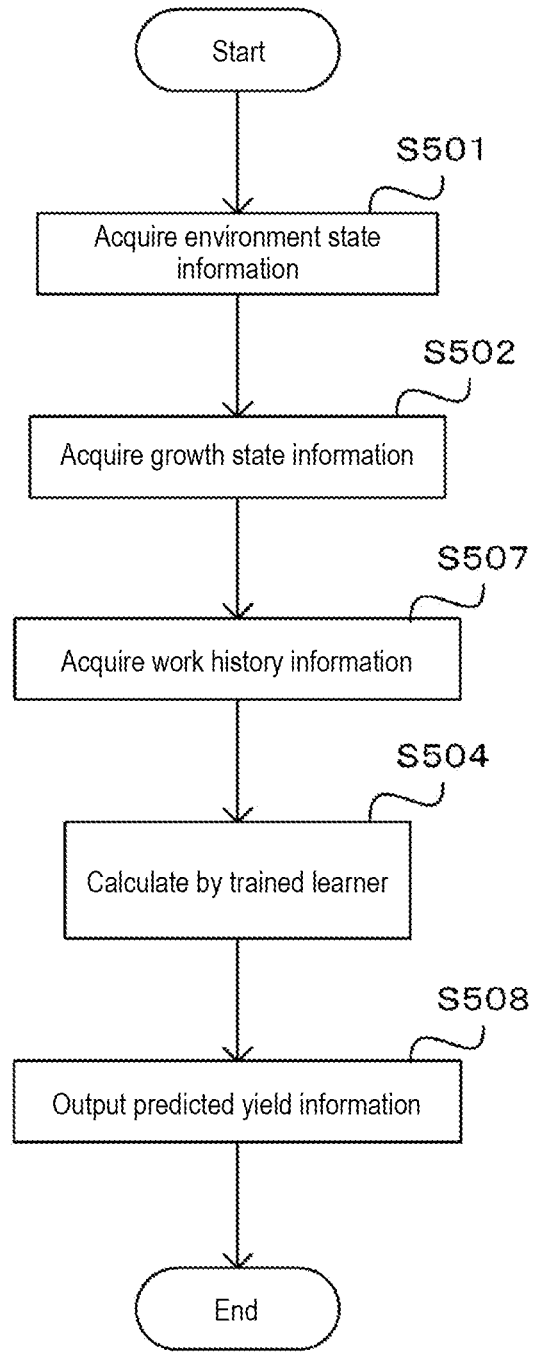

FIG. 16(B) is a flowchart showing the process steps of a yield prediction method as another cultivation and management method. The same symbols are used for the same processes as the cultivation and management method shown in FIG. 16(A) to omit description thereof.

First, the environment state information acquisition unit 920 acquires the environment state information (step S501).

Next, the growth state information acquisition unit 921 acquires the growth state information (step S502).

Next, the work history information acquisition unit 923 acquires the work history (step S507).

Then, the calculation unit 924 inputs the environment state information, the growth state information, and the work history information to the trained learner 526 to perform the calculation process (step S504).

Then, the calculation unit 924 outputs, through the calculation process in step S704, the predicted yield under the environment state and the growth state specified by the environment state information and the growth state information, and the work history up to that point that have been input. The control unit 210 acquires the planned yield information 928 and outputs it to, for example, the output unit 215.

In this way, the accuracy of yield prediction is improved by using the learner that takes into account human intervention in the cultivation of the target plant.

In order to make it possible to compare required components of the invention with the configurations of the embodiments, the required components of the invention are described below with symbols used in the drawings.

<Invention 1>

A cultivation and management device for fruit vegetable plants and fruit trees (200) including:
  environment state information on an environment state of a fruit vegetable plant or a fruit tree to be cultivated;
  planned cultivation evaluation index information on a preplanned cultivation evaluation index of the fruit vegetable plant or the fruit tree;
  a calculation unit (223) configured to determine and output a work including a shape change work for the fruit vegetable plant or the fruit tree with respect to inputs of the environment state information and the planned cultivation evaluation index information, the calculation unit using a learning model (25) trained on a cultivation evaluation index of the fruit vegetable plant or the fruit tree cultivated, an environment state of the fruit vegetable plant or the fruit tree when cultivating the fruit vegetable plant or the fruit tree, and a work history of a work for the fruit vegetable plant or the fruit tree, the work including the shape change work for changing a shape of the fruit vegetable plant or the fruit tree when cultivating the fruit vegetable plant or the fruit tree; and
  an output unit configured to output the work including the shape change work for the fruit vegetable plant or the fruit tree.

<Invention 2>

A cultivation and management device for fruit vegetable plants and fruit trees (200) including:
  environment state information on an environment state of a fruit vegetable plant or a fruit tree to be cultivated;
  work history information on a history of a work for the fruit vegetable plant or the fruit tree, the work including a shape change work for changing a shape of the fruit vegetable plant or the fruit tree;
  a calculation unit (223) configured to output a predicted cultivation evaluation index of the fruit vegetable plant or the fruit tree with respect to inputs of the environment state information and the work history information, the calculation unit using a learning model (25) trained on a cultivation evaluation index of the fruit vegetable plant or the fruit tree cultivated, an environment state of the fruit vegetable plant or the fruit tree when cultivating the fruit vegetable plant or the fruit tree, and a work history of a work including the shape change work for the fruit vegetable plant or the fruit tree when cultivating the fruit vegetable plant or the fruit tree; and
  an output unit (215) configured to output the predicted cultivation evaluation index of the fruit vegetable plant or the fruit tree.

<Invention 3>

A learning device (100) including:
  a training environment state information acquisition unit (21) configured to acquire training environment state information on an environment state of a fruit vegetable plant or a fruit tree to be cultivated;
  a training work history information acquisition unit (22) configured to acquire training work history information on a history of a work for the fruit vegetable plant or the fruit tree, the work including a shape change work for changing a shape of the fruit vegetable plant or the fruit tree when cultivating the fruit vegetable plant or the fruit tree;

a training cultivation evaluation index acquisition unit (23) configured to acquire training cultivation evaluation index information on a cultivation evaluation index of the fruit vegetable plant or the fruit tree; and a learning process unit (24) configured to generate a learning model (25) configured to determine and output a work including the shape change work for the fruit vegetable plant or the fruit tree with respect to inputs of environment state information and preplanned cultivation evaluation index information of the fruit vegetable plant or the fruit tree when cultivating the fruit vegetable plant or the fruit tree, the learning model being trained on training data including at least the training environment state information, the training work history information, and the training cultivation evaluation index information.

DESCRIPTION OF SYMBOLS 100 learning device
21 training environment state information acquisition unit
22 training work history information acquisition unit
23 training yield acquisition unit
24 learning process unit
25 learner
500 learning device
521 training environment state information acquisition unit
522 training work history information acquisition unit
523 training yield acquisition unit
524 training growth state information acquisition unit
525 learning process unit
526 learner
200 cultivation and management device
220 environment state information acquisition unit
221 planned yield acquisition unit
223 calculation unit
224 work instruction information
600 cultivation and management device
620 environment state information acquisition unit
621 growth state information acquisition unit
622 planned yield acquisition unit
624 calculation unit
625 work instruction information

The invention claimed is:

1. A cultivation and management system for fruit vegetable plants and fruit trees comprising:

a greenhouse configured to house a fruit vegetable plant or a fruit tree to be cultivated;

at least one environment sensor configured to measure a value corresponding to an environment state of the greenhouse;

at least one growth sensor configured to measure a value corresponding to a growth state of the fruit vegetable plant or the fruit tree disposed in the greenhouse;

at least one environment state controller configured to control the environment state of the greenhouse;

a cultivation and management device including (i) at least one memory configured to store computer-executable instructions and at least one processor configured to execute the computer-executable instructions stored in the at least one memory, (ii) at least one integrated circuit, or both (i) and (ii) that cause the cultivation and management device to:

acquire environment state information indicating an environment state of the fruit vegetable plant or the fruit tree disposed in the greenhouse based on the value, measured by the at least one environment sensor, corresponding to the environment state of the greenhouse;

acquire growth state information indicating the growth state of the fruit vegetable plant or the fruit tree disposed in the greenhouse based on the value, measured by the at least one growth sensor, corresponding to the growth state of the fruit vegetable plant or the fruit tree;

acquire planned cultivation evaluation index information on a preplanned cultivation evaluation index of the fruit vegetable plant or the fruit tree;

implement a calculator configured to determine and output a work including a shape change work for the fruit vegetable plant or the fruit tree and being quantified according to a work type with respect to inputs of the environment state information, the growth state information, and the planned cultivation evaluation index information, the calculator using a learning model trained on a cultivation evaluation index of the fruit vegetable plant or the fruit tree cultivated, an environment state of the fruit vegetable plant or the fruit tree when cultivating the fruit vegetable plant or the fruit tree, a growth state of the fruit vegetable plant or the fruit tree when cultivating the fruit vegetable plant or the fruit tree, and a chronologically identified work history of a quantified historical work for the fruit vegetable plant or the fruit tree, the quantified historical work including the shape change work for changing a shape of the fruit vegetable plant or the fruit tree when cultivating the fruit vegetable plant or the fruit tree and being quantified according to the work type; and implement an outputter configured to output the work including the shape change work for the fruit vegetable plant or the fruit tree and being quantified according to the work type, wherein the calculator is further configured to use the learning model to determine and output a state control instruction with respect to the inputs of the environment state information, the growth state information, and the planned cultivation evaluation index information, wherein the outputter is further configured to output the state control instruction to thereby control the at least one environment state controller to thereby control the environment state of the greenhouse, and wherein the learning model is generated by reinforcement learning using the environment state information as a state of an environment, the quantified historical work including the shape change work for the fruit vegetable plant or the fruit tree as an action on the environment, and the cultivation evaluation index as a reward.

2. The cultivation and management system for fruit vegetable plants and fruit trees according to claim 1, wherein the chronologically identified work history includes a history of a quantified historical work whose amount of work cannot be expressed as a continuous value.

3. A cultivation and management method using a cultivation and management system for fruit vegetable plants and fruit trees, the cultivation and management system including a housing configured to house a fruit vegetable plant or a fruit tree to be cultivated, at least one environment sensor configured to measure a value corresponding to an environment state of the housing, at least one growth sensor configured to measure a value corresponding to a growth state of the fruit vegetable plant or the fruit tree disposed in the housing, and at least one environment state controller configured to control the environment state of the housing, the cultivation and management method comprising:

acquiring environment state information indicating an environment state of the fruit vegetable plant or the fruit tree disposed in the housing based on the value, measured by the at least one environment sensor, corresponding to the environment state of the housing;

acquiring growth state information indicating the growth state of the fruit vegetable plant or the fruit tree disposed in the housing based on the value, measured by the at least one growth sensor, corresponding to the growth state of the fruit vegetable plant or the fruit tree;

acquiring planned cultivation evaluation index information on a preplanned cultivation evaluation index of the fruit vegetable plant or the fruit tree;

determining a work including a shape change work for the fruit vegetable plant or the fruit tree and being quantified according to a work type with respect to inputs of the environment state information, the growth state information, and the planned cultivation evaluation index information, the work being determined using a learning model trained on a cultivation evaluation index of the fruit vegetable plant or the fruit tree cultivated, an environment state of the fruit vegetable plant or the fruit tree when cultivating the fruit vegetable plant or the fruit tree, a growth state of the fruit vegetable plant or the fruit tree when cultivating the fruit vegetable plant or the fruit tree, and a chronologically identified work history of a quantified historical work for the fruit vegetable plant or the fruit tree, the quantified historical work including the shape change work for changing a shape of the fruit vegetable plant or the fruit tree when cultivating the fruit vegetable plant or the fruit tree and being quantified according to the work type;

outputting the work including the shape change work for the fruit vegetable plant or the fruit tree and being quantified according to the work type;

determining, using the learning model, a state control instruction with respect to the inputs of the environment state information, the growth state information, and the planned cultivation evaluation index information; and outputting the state control instruction to thereby control the at least one environment state controller to thereby control the environment state of the housing, wherein the learning model is generated by reinforcement learning using the environment state information as a state of an environment, the quantified historical work including the shape change work for the fruit vegetable plant or the fruit tree as an action on the environment, and the cultivation evaluation index as a reward.

4. The cultivation and management method for fruit vegetable plants and fruit trees according to claim 3, wherein the chronologically identified work history includes a history of quantified historical work whose amount of work cannot be expressed as a continuous value.

5. A non-transitory computer readable medium storing a cultivation and management program for executing a cultivation and management method using a cultivation and management system for fruit vegetable plants and fruit trees, the cultivation and management system including a housing configured to house a fruit vegetable plant or a fruit tree to be cultivated, at least one environment sensor configured to measure a value corresponding to an environment state of the housing, at least one growth sensor configured to measure a value corresponding to a growth state of the fruit vegetable plant or the fruit tree disposed in the housing, and at least one environment state controller configured to control the environment state of the housing, the cultivation and management method comprising:

acquiring environment state information indicating an environment state of the fruit vegetable plant or the fruit tree disposed in the housing based on the value, measured by the at least one environment sensor, corresponding to the environment state of the housing;

acquiring growth state information indicating the growth state of the fruit vegetable plant or the fruit tree disposed in the housing based on the value, measured by the at least one growth sensor, corresponding to the growth state of the fruit vegetable plant or the fruit tree;

acquiring planned cultivation evaluation index information on a preplanned cultivation evaluation index of the fruit vegetable plant or the fruit tree;

determining a work including a shape change work for the fruit vegetable plant or the fruit tree and being quantified according to a work type with respect to inputs of the environment state information, the growth state information, and the planned cultivation evaluation index information, the work being determined using a learning model trained on a cultivation evaluation index of the fruit vegetable plant or the fruit tree cultivated, an environment state of the fruit vegetable plant or the fruit tree when cultivating the fruit vegetable plant or the fruit tree, a growth state of the fruit vegetable plant or the fruit tree when cultivating the fruit vegetable plant or the fruit tree, and a chronologically identified work history of a quantified historical work for the fruit vegetable plant or the fruit tree, the quantified historical work including the shape change work for changing a shape of the fruit vegetable plant or the fruit tree when cultivating the fruit vegetable plant or the fruit tree and being quantified according to the work type;

outputting the work including the shape change work for the fruit vegetable plant or the fruit tree and being quantified according to the work type;

determining, using the learning model, a state control instruction with respect to the inputs of the environment state information, the growth state information, and the planned cultivation evaluation index information; and outputting the state control instruction to thereby control the at least one environment state controller to thereby control the environment state of the housing, wherein the learning model is generated by reinforcement learning using the environment state information as a state of an environment, the quantified historical work including the shape change work for the fruit vegetable plant or the fruit tree as an action on the environment, and the cultivation evaluation index as a reward.

6. The non-transitory computer readable medium storing a cultivation and management program for fruit vegetable plants and fruit trees according to claim 5, wherein
the chronologically identified work history includes a history of quantified historical work whose amount of work cannot be expressed as a continuous value.

* * * * *